United States Patent
Dummermuth et al.

(10) Patent No.: US 12,542,615 B2
(45) Date of Patent: Feb. 3, 2026

(54) CHANNEL-SELECTIVE RF POWER SENSOR

(71) Applicant: BIRD TECHNOLOGIES GROUP INC, Solon, OH (US)

(72) Inventors: Martin E. Dummermuth, Chagrin Falls, OH (US); Jeffrey Klis, Chardon, OH (US); Timothy L. Holt, Chardon, OH (US); John Washell, Willowick, OH (US)

(73) Assignee: BIRD TECHNOLOGIES GROUP INC., Solon, OH (US)

( * ) Notice: Subject to any disclaimer, the term of this patent is extended or adjusted under 35 U.S.C. 154(b) by 713 days.

(21) Appl. No.: 15/735,584

(22) PCT Filed: Jun. 13, 2016

(86) PCT No.: PCT/US2016/037291
§ 371 (c)(1),
(2) Date: Dec. 11, 2017

(87) PCT Pub. No.: WO2016/201453
PCT Pub. Date: Dec. 15, 2016

(65) Prior Publication Data
US 2018/0316444 A1    Nov. 1, 2018

Related U.S. Application Data

(60) Provisional application No. 62/175,172, filed on Jun. 12, 2015.

(51) Int. Cl.
*H04B 17/318* (2015.01)
*G01R 21/01* (2006.01)
(Continued)

(52) U.S. Cl.
CPC ........... *H04B 17/318* (2015.01); *G01R 21/01* (2013.01); *G01R 23/163* (2013.01); *G01R 27/06* (2013.01)

(58) Field of Classification Search
CPC ...... H04B 17/318; H04B 17/00; H04B 17/30; H04B 17/309; G01R 23/163; G01R 21/01;
(Continued)

(56) References Cited

U.S. PATENT DOCUMENTS 4,504,785 A    3/1985   Tucker
4,547,728 A *  10/1985  Mecklenburg ......... G01R 21/00
                                                          324/95

(Continued)

FOREIGN PATENT DOCUMENTS

CA       2988990       12/2016
WO    2016201453       12/2016

OTHER PUBLICATIONS

Oh et al.: "Automatic antenna-tuning unit for software-defined and cognitive radio"; Arizona State University, Tempe, AZ, U.S.A. (Year: 2007).*

(Continued)

*Primary Examiner* — Hoai-An D. Nguyen
(74) *Attorney, Agent, or Firm* — McDonald Hopkins LLC

(57) ABSTRACT

Disclosed is a channel-selective RF power sensor having a coupler and a channel-selective power measurement circuit. The said coupler is configured to obtain a sample of energy travelling on a main transmission line and provide the sample of energy to the channel-selective power measurement circuit. The sample of energy has a channel of interest. The channel-selective power measurement circuit is configured to measure RF energy information for the channel of interest in the sample of energy. Also disclosed is a method of measuring RF energy information for a channel of interest. The method includes providing a channel-selective RF power sensor and a main transmission line and obtaining a (Continued)

sample of energy from the main transmission line using a coupler of the channel-selective RF power sensor.

17 Claims, 25 Drawing Sheets

(51) Int. Cl.
   *G01R 23/163* (2006.01)
   *G01R 27/06* (2006.01)
(58) Field of Classification Search
   CPC ........ G01R 27/06; G01R 27/00; G01R 27/02; G01R 27/04; G01R 23/00; G01R 23/16; G01R 21/00
   USPC .............................................. 324/76.11, 126
   See application file for complete search history.

(56) References Cited

U.S. PATENT DOCUMENTS

| | | | |
|---|---|---|---|
| 4,652,816 A | | 3/1987 | Crookshanks |
| 4,703,433 A | | 10/1987 | Sharrit |
| 4,818,949 A | | 4/1989 | Cohen |
| 4,958,294 A | | 9/1990 | Herscher |
| 6,157,183 A | | 12/2000 | Bradley |
| 6,356,067 B1 | | 3/2002 | Nara |
| 6,633,766 B1 | | 10/2003 | van der Pol |
| 7,254,191 B2 | | 8/2007 | Sugar |
| 7,292,656 B2 | | 11/2007 | Kloper |
| 7,400,129 B1 | | 7/2008 | Prather |
| 7,715,800 B2 | | 5/2010 | Sinha |
| 11,415,605 B2* | | 8/2022 | Dummermuth ...... G01R 15/146 |
| 2002/0094014 A1* | | 7/2002 | Kim .................... H03G 3/3089 375/130 |
| 2002/0113601 A1* | | 8/2002 | Swank, II ............. G01R 27/06 324/637 |
| 2003/0050014 A1* | | 3/2003 | Cain ..................... H04B 17/20 455/67.11 |
| 2003/0215373 A1* | | 11/2003 | Reyzelman ....... H01J 37/32174 422/186.29 |
| 2009/0046030 A1* | | 2/2009 | Song ....................... H03J 3/06 333/17.3 |
| 2009/0253385 A1* | | 10/2009 | Dent ................... H04B 1/0458 455/83 |
| 2010/0052652 A1 | | 3/2010 | Mitchell |
| 2010/0066256 A1* | | 3/2010 | Meddaugh .............. H05H 7/12 315/156 |
| 2011/0119001 A1* | | 5/2011 | Holt ....................... G01R 21/00 702/60 |
| 2012/0071123 A1* | | 3/2012 | Jones .................. H04B 7/0814 455/150.1 |
| 2014/0314135 A1 | | 10/2014 | Duan |
| 2014/0327429 A1* | | 11/2014 | Ziomek ................. H04B 17/16 324/96 |

OTHER PUBLICATIONS

Peterson, Blake "Spectrum Analysis Basics, Agilent Technologies" Feb. 25, 2014, 89 pages long.
"Agilent Vector Signal Analysis Basics Application Note" Nov. 12, 2012, 42 pages long.
International Search Report and Written Opinion for corresponding International Application No. PCT/US2016/037291 dated Aug. 26, 2016, 13 pages long.
International Preliminary Report on Patentability "IPRP" for Corresponding International Application No. PCT/US2016/037291 filed on Jun. 13, 2016 dated Dec. 12, 2017, 7 pages long.
European Communication Pursuant to Rules 161 (1) and 162 EPC for European Application No. 16730996.2 filed Dec. 13, 2017 dated Jan. 19, 2018, 3 pages long.
Extended European Search Report (EESR) for corresponding European patent application No. 21170749.2 dated Aug. 10, 2021, 9 pages long.
Office Action issued in corresponding Canadian Application No. 2,988,990, dated Sep. 14, 2022, 4 pages.
Office Action dated Jun. 1, 2023; Canadian Patent Application No. 2,988,990; 5 pages.
Office Action dated Mar. 15, 2024; Canadian Patent Application No. 2,988,990; 4 pages.

* cited by examiner

CHANNEL-SELECTIVE RF POWER SENSOR

CROSS-REFERENCE TO RELATED APPLICATIONS

This application is the US National phase entry of International Patent Application No. PCT/US2016/037291 filed Jun. 13, 2016, which claims priority to U.S. Provisional Patent Application Ser. No. 62/175,172, filed Jun. 12, 2015, and titled CHANNEL-SELECTIVE RF POWER SENSOR, all of the above listed applications are incorporated by reference herein.

FIELD OF THE INVENTION

This application is directed to radio frequency (RF) power measurement. More specifically, to a receiver based channel-selective RF power sensor.

BACKGROUND OF THE INVENTION

There are many applications within the radio communications industry, where it is desired to measure the power for an individual channel that is present within a transmission line structure. This increases the need for channel-selective RF power sensors.

BRIEF SUMMARY OF THE INVENTION

According to one aspect of the invention, a channel-selective RF power sensor comprises a coupler and a channel-selective power measurement circuit. The coupler is configured to obtain a sample of energy travelling on a main transmission line and provide the sample of energy to the channel-selective power measurement circuit. The sample of energy contains a channel of interest. The channel-selective power measurement circuit is configured to measure RF energy information for the channel of interest in the sample of energy.

In another aspect of the invention, the channel-selective power measurement circuit is further configured to calculate and output RF energy information for the channel of interest of the sample of energy.

In another aspect of the invention, the channel-selective power measurement circuit has a tuneable receiver configured to select the channel of interest in the sample of energy by rejecting frequencies in the sample of energy that are outside of the bandwidth of the channel of interest, wherein the center frequency and bandwidth of the channel of interest is user selectable.

In another aspect of the invention, the bandwidth of the channel is one of 6.25 kHz, 12.5 kHz, or 25 kHz.

In another aspect of the invention, the RF energy information includes RMS power, peak power, duty cycle, crest factor, VSWR, complementary cumulative distribution function, peak, average, peak-to-average ratio, rise time, fall time, and pulse width.

In another aspect of the invention, the RF power sensor is calibratable across temperature and frequency.

In another aspect of the invention, the receiver is configured to down-convert the sample of energy to baseband or a low intermediate frequency.

In another aspect of the invention, the receiver has a local oscillator that is tunable over a wide frequency range, thereby permitting the channel-selective RF power sensor to measure power at frequencies within about the frequency range of the local oscillator.

In another aspect of the invention, the local oscillator down-converts the sample of energy to baseband of low intermediate frequency using an in-phase signal, a quadrature signal, an in-phase mixer, and a quadrature mixer.

In another aspect of the invention, the channel-selective power measurement circuit has an in-phase bandpass filter and a quadrature bandpass filter that pass only frequencies of the downconverted sample of energy within the channel of interest.

In another aspect of the invention, the in-phase bandpass filter and quadrature bandpass filter can be digital filters or analog filters.

In another aspect of the invention, the bandpass filter in an FIR filter.

In another aspect of the invention, the coupler is directional or non-directional, wherein the directional coupler has an RF switch with a forward position and a reflected position, thereby allowing the forward and reflected power obtained by the directional coupler to be multiplexed for processing by the channel-selective power measurement circuit.

In another aspect of the invention, the channel-selective power measurement circuit has a variable gain stage that permits the amplification of small signals, thereby increasing the dynamic range of the channel-selective RF power sensor.

In another aspect of the invention, the channel-selective power measurement circuit is comprised of integrated devices or discrete devices.

In another aspect of the invention, the RF power sensor is a thru-line sensor or a terminating sensor.

In yet another aspect of the invention, a method of measuring RF energy information for a channel of interest comprises providing a channel-selective RF power sensor and a main transmission line, obtaining a sample of energy from the main transmission line using a coupler of the channel-selective RF power sensor, providing the sample of energy to a channel-selective power measurement circuit, and measuring the RF energy information for the channel of interest in the sample of energy using the channel-selective power measurement circuit.

In another aspect of the invention, the method further includes calculating and outputting RF energy information for the channel of interest of the sample of energy.

In another aspect of the invention, the method further comprises selecting the channel of interest in the sample of energy by rejecting frequencies in the sample of energy that are outside of the bandwidth of the channel of interest, wherein the center frequency and the bandwidth of the channel of interest are user selectable.

In another aspect of the invention, the bandwidth of the channel is one of 6.25 kHz, 12.5 kHz, or 25 kHz.

In another aspect of the invention, the RF energy information includes RMS power, peak power, duty cycle, crest factor, VSWR, complementary cumulative distribution function, peak, average, peak-to-average ratio, rise time, fall time, and pulse width.

In another aspect of the invention, the method further comprising, calibrating the receiver for a temperature of the receiver and a frequency of the channel.

In another aspect of the invention, the method further comprises downconverting the sample of energy to a baseband or a low intermediate frequency using the channel-selective power measurement circuit.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
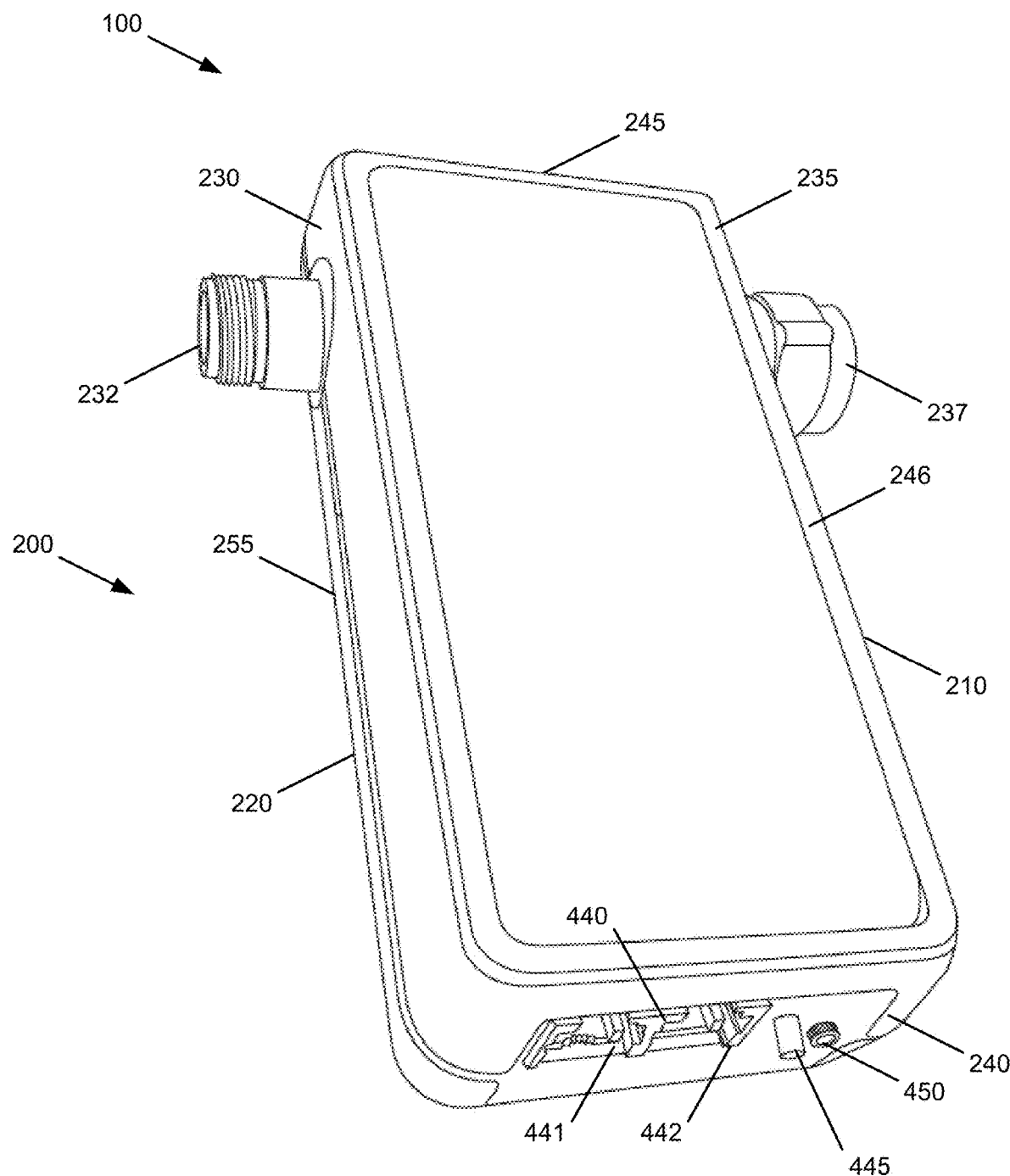
FIG. 1 is an isometric view of a channel-selective radio frequency (RF) power sensor having a frequency compensated shortline dual directional coupler in accordance with an exemplary embodiment of the invention.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and coprocessor architectures, including, but not limited to, a microcontroller containing both a processor and memory, programmable logic array (PLA), application specific integrated circuit (ASIC), or any type of device suitable for processing signals, performing general computing, and/or arithmetic functions. The processor can include various modules to execute various functions.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can also include a disk. The memory can store an operating system that controls or allocates resources of a computing device. The memory can also store data for use by the processor.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system and/or program that controls or allocates resources of a computing device.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, ASICs, or any type of media suitable for storing electronic instructions, and each electrically connected to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

RF power sensors, capable of measuring RF/microwave power on a transmission line, are tools for engineers and technicians in the wireless marketplace. They are used to convert RF power into an analog voltage that is read by a meter and presented as a power reading. Measuring the amount of power being transmitted out the antenna of a wireless system, as well as the power reflected from the antenna, is helpful for monitoring the health of the system, as well as complying with regulatory standards. Historically, the total (composite) power that is being transmitted has been measured. Traditional RF power sensors are broadband devices, measuring power over a wide bandwidth, typically hundreds of megahertz to several gigahertz. This lends itself well to measuring composite power, because the RF power sensor does not differentiate between different signals, but measures the combined power of all signals that are present.

As was stated above, in modern communication systems, the demand for increased capacity and better coverage is always on the rise. To accommodate this demand, more and more communication channels are being added to systems. Rather than installing a new antenna for every new channel that is added, multiple signals, different channels, and even multiple service providers all transmit signals out of the same antenna. Signal combiners, such as diplexers or triplexers, are used to multiplex the signals from several different radios or transmitters on to one antenna.

RF power sensors can be installed on either side of the combining system to measure the power of various signals. If installed pre-combiner, the RF power sensor will measure the power of an individual channel, because that is the only signal that is present at that location. If installed post-combiner, the traditional RF power sensor will measure the composite power of all the signals that are combined by the combiner, and therefore passed onto the same antenna. Accordingly, because traditional RF power sensors are broadband, it is not possible to differentiate the power between different channels when a power sensor is installed post-combiner.

RF power sensors have been in use for many years with the primary sensing element being either a thermal sensor or a diode detector. Both of these primary sensor element types are inherently broadband. Many improvements have been made to both types of sensors over the years, primarily focusing on increasing bandwidth, improving linearity and dynamic range, and reducing temperature effects. RF power sensors today employ all of these improvements to achieve the widest frequency range and accuracy possible.

Accordingly, a need exists for an RF power sensor that is capable of measuring the power in an individual channel when installed post-combiner. Stated alternatively, a need exists for a power sensor that is frequency-selective, thereby capable of measuring the power in an individual channel of a broadband signal containing multiple channels. Channel-selective RF power sensor 100 enables the measurement of the power in an individual channel, which permits at least the following measurements to be made: forward power by channel, reflected power by channel, VSWR by channel, and combiner losses by channel. Channel-to-channel measurements and comparisons can also be made. These types of measurements are traditionally only accomplished through the use of a spectrum analyzer or measuring receiver. Both of these types of instruments are significantly more complex and expensive than a channel-selective RF power sensor 100, due in part to the fact that they are designed to perform a variety of other measurements which are generally not of interest to a person having ordinary skill in the art that is interested in the signal power.

Channel-selective RF power sensor 100 is a frequency-selective RF/microwave power sensor that is capable of measuring the power of a single frequency (or channel) in the presence of other signals at different frequencies. Channel-selective RF power sensor 100 uses a receiver-based design, where the sampled RF signal is down-converted to baseband, or a low intermediate frequency (IF). The receiver 410 has a local oscillator (LO) 413 that is able to tune over a wide frequency range, enabling the channel-selective RF power sensor 100 to be configured to measure the power at any frequency within that range. The signal from local oscillator 413 is applied at 0° and 90° to two mixers, in-phase mixer 412 and quadrature mixer 415, to generate in-phase (I) and quadrature (Q) outputs. This allows for frequency-conversion to baseband without the image frequency causing measurement errors.

The resulting in-phase and quadrature signals are digitized by an analog-to-digital converter (ADC), in-phase ADC 422 and quadrature ADC 424. Once sampled, the digital IF signals are band-pass filtered by finite impulse response (FIR) filters, in-phase bandpass filter module 431 and quadrature bandpass filter module 434, to pass only those signals within the desired measurement bandwidth. In order to reject the image frequency, the in-phase and quadrature signals are summed together by summing module 433 after an additional 90° phase shift by phase shift module 435. This phase shift causes the desired signal to add constructively, and the undesired image to add destructively, leaving only the desired signal. The phase shift by phase shift module 435 is implemented using a Hilbert transform on one path and an equivalent delay is implemented using delay module 432 on the other path. A root-mean-square (RMS) is performed by function module 436 on the resulting dataset to calculate the true average power. A voltage-variable gain stage 411 at the front of the receiver 410 helps amplify small signals, increasing the sensor's dynamic range. In an exemplary embodiment of channel-selective RF power sensor 100, receiver 410 has a frequency range from about 100 MHz to about 1000 MHz. In an exemplary embodiment, receiver 410 can be an ADRF6850 integrated broadband receiver from Analog Devices of Norwood, Mass.

In exemplary embodiments of channel-selective RF power sensor 100 having a directional coupler 301, a single-pole double-throw RF switch 345 allows for measurements of forward power originating from the forward power channel 303 of directional coupler 301 and reflected power measurements originating from the reflected power channel 304 of directional coupler 301 to be multiplexed and processed by the same signal path of receiver 410 and channel-selective power measurement circuit 400, to avoid duplicating the entire receiver chain circuitry for each of the forward power channel 303 and reflected power channel 304. In an exemplary embodiment, RF switch 345 can be a single pole double throw RF switch with low insertion loss, good insulation between inputs, and a flat frequency response.

Channel-selective RF power sensor 100 permits a user to simply and accurately measure forward and reflected RF power at a specific frequency (or channel) in the presence of signals (or channels) at different frequencies. This is useful in applications such as land-mobile radio, where many different channels are spaced very close together (e.g. 6.25 kHz spacing). In such systems, the ability to measure the power in a single channel permits the monitoring of the performance of the transmitter, combining system, and antenna at that particular channel. Existing power sensors are not able to accomplish the same measurement, because they are only able to measure the composite power across all channels. Spectrum analyzers or measuring receivers can accomplish the measurement, but with much more complexity and a significantly higher cost.

Channel-selective RF power sensor 100 can measure the RF power in a single channel by using a tunable receiver 410 to select the desired measurement frequency. This receiver 410 can be designed to cover a wide range of frequencies, enabling the channel-selective RF power sensor 100 to measure power at any of the popular communication bands. A digital filter, such as in-phase bandpass filter module 431 and quadrature bandpass filter module 434 can be used to reject signals outside the desired measurement bandwidth. This in-phase bandpass filter module 431 and quadrature bandpass filter module 434 can be user-configured to different bandwidths to allow for measurement of 6.25 kHz, 12.5 kHz, and 25 kHz wide channels, just to name a few. Channel-selective RF power sensor 100 can be calibrated across temperature and frequency, so that the power sensor provides accurate measurements under all conditions.

Channel-selective RF power sensor 100 can be a thru-line or a terminating sensor. The receiver 410 and other circuitry within channel-selective power measurement circuit 400 may be integrated devices or discrete design. The baseband filtering by in-phase bandpass filter module 431 and quadrature bandpass filter module 434 may be implemented as an analog or digital filter. Digital filtering may be software configurable to allow for user-configured filter bandwidth. Power of the baseband signal may be measured directly (with a diode or thermal device) or the baseband signal may be digitized and power calculated from the digital data. Digital data may be used to calculate any number of measurements, such as, but not limited to, RMS power, peak power, duty cycle, crest factor, and statistics.

Turning to FIGS. 1-5, RF power sensor 100 has a carrier body 200 with a coupler 300, a power measurement circuit 400, a printed circuit board (PCB) 500, and a transmission line assembly. In one exemplary embodiment, carrier body 200 is plastic and rectangular in shape. Carrier body 200 has an upper portion 210, lower portion 220, left side 230, right side 235, bottom 240, top 245, front 246, and back 255. Left side 230 is spaced apart from and located opposite right side 235. Front 246 and back 255 are spaced apart and located opposite each other, and span between left side 230, right side 235, top 245 and bottom 240. Bottom 240 and top 245 are spaced apart and located opposite each other, and span between front 246, back 255, left side 230, and right side 235. Coupler 300 can be a frequency compensated shortline directional coupler 301.

Left side 230 has an upstream connector 232. Right side 235 has a downstream connector 237. Upstream connector 232 is electrically connectable to an upstream end 601 of main transmission line 600. Downstream connector 237 is electrically connectable to a downstream end 602 of main transmission line 600. Bottom 240 has a port 442, reset switch 445, and LED 450. Port 442 can include a first port 443 and a second port 444. In an exemplary embodiment, port 442 is an RS-485 interface that is electrically connected to transceiver 441 of communication interface 440, wherein first port 443 and second port 444 permit the daisy chaining of multiple channel-selective RF power sensors 100.

The upper portion 210 has an upper portion forward cavity 211 with an upper portion forward cavity surface 212, and an upper portion rear cavity 215 with an upper portion rear cavity surface 216. In one exemplary embodiment, upper portion forward cavity surface 212 and upper portion rear cavity surface 216 have a metallic coating. An upper portion dividing wall 218 divides the upper portion forward cavity 211 from the upper portion rear cavity 215. The upper portion dividing wall 218 runs from the left side 230 to the right side 235, parallel to the top 245. The upper portion dividing wall 218 has a base 219.

The lower portion 220 has a lower portion forward cavity 221 with a lower portion forward cavity surface 222, and a lower portion rear cavity 225 with a lower portion rear cavity surface 226. In one exemplary embodiment, lower portion forward cavity surface 222 and lower portion rear cavity surface 226 have a metallic coating. A lower portion dividing wall 228 divides the lower portion forward cavity 221 from the lower portion rear cavity 225. The lower portion dividing wall 228 runs from the left side 230 to the right side 235, parallel to the top 245. The lower portion dividing wall 228 has a base 229.

A first side 213 of the upper portion 210 contacts a first side 223 of the lower portion 220, when the upper portion 210 and the lower portion 220 are assembled to form the carrier body 200.

Transmission line assembly 250 includes upstream connector 232, downstream connector 237, and coupler transmission line section 251. Upstream connector 232 and downstream connector 237 are electrically connected to coupler transmission line section 251. More specifically, upstream connector 232 is electrically connected to upstream section 252 of coupler transmission line section 251, and downstream connector 237 is electrically connected to downstream section 253 of coupler transmission line section 251. In an exemplary embodiment, coupler transmission line section 251 can be a microstrip transmission line or a rigid air transmission line.

The circuitry in channel-selective power measurement circuit 400 can be sensitive to stray energy. Accordingly, some exemplary embodiments of channel-selective RF power sensor 100 include measures to reduce the amount of energy from coupler transmission line section 251 that can migrate to the power measurement circuit 400.

In one exemplary embodiment, PCB 500 includes a via wall 340 that travels from a top of PCB 500 to a bottom of PCB 500. Via wall 340 works in conjunction with the upper portion dividing wall 218 and the lower portion dividing wall 228 to minimize the amount of energy travelling on coupler transmission line section 251 from entering the rear cavity formed by upper portion rear cavity 215 and lower portion rear cavity 225.

More specifically, via wall 340 travels through PCB 500 and has a copper trace on the topside of PCB 500 and on the bottom side of PCB 500. Via wall 340 on the topside contacts the base 219 of upper portion dividing wall 218, and via wall 340 on the bottom side contacts the base 229 of the lower portion dividing wall 228. Therefore, since the upper portion dividing wall 218 and lower portion dividing wall 228 are both coated in a metallic finish, via wall 340, upper portion dividing wall 218, and lower portion dividing wall 228 form a metallic barrier between the coupler transmission line section 251 and the channel-selective power measurement circuit 400. PCB 500 can be constructed out of any standard PCB material, such as FR-4, or higher-frequency printed circuit board materials offered by Rogers or Arlon.

Further, in some exemplary embodiments of channel-selective RF power sensor 100, the metallic coating on the upper portion rear cavity surface 216 and lower portion rear cavity surface 226 also form a metallic barrier to help prevent energy around channel-selective RF power sensor 100 from interfering with the operation of channel-selective power measurement circuit 400.

Additionally, in some exemplary embodiments of channel-selective RF power sensor 100, the metallic coating on the upper portion forward cavity surface 212 and lower portion forward cavity surface 222 also form a metallic barrier to help prevent energy emitted by coupler transmission line section 251 from migrating out of the forward cavity formed by the upper portion forward cavity 211 and lower portion forward cavity 221 and interfering with the operation of channel-selective power measurement circuit 400.

In some exemplary embodiments, coupler section 505 and detection section 510 are located on separate PCBs 500, and in other exemplary embodiments, coupler section 505 and detection section 510 are located on the same PCB 500. Further, coupler section 505 and detection section 510 are separated by via wall 340.

Channel-selective RF power sensor 100 has a coupler 300 electrically connected to channel-selective power measurement circuit 400. Channel-selective power measurement circuit 400 is electrically connectable to channel power meter 720. Coupler 300 samples the energy on main transmission line 600 (RF voltage) and provides a sample of the energy to channel-selective power measurement circuit 400. Coupler 300 can be a directional coupler 301 or a non-directional coupler 302.

In exemplary embodiments of channel-selective RF power sensor 100 having a non-directional coupler 302, channel-selective power measurement circuit 400 receives the sample of energy from non-directional coupler 302 and produces an output of RF energy information which is representative of the energy travelling on main transmission line 600 for the channel or channels of interest. The RF energy information can include various measurements of the energy travelling on main transmission line 600, including, but not limited to, RMS power, peak power, duty cycle, crest factor, VSWR, and other statistics that a person having ordinary skill in the art may find of interest.

In exemplary embodiments of channel-selective RF power sensor 100 having a directional coupler, power measurement circuit 400 receives a sample of forward energy and a sample of reflected energy from directional coupler 301, and produces an output of RF energy information which is representative of the forward energy travelling on main transmission line 600 and an output which is representative of the reflected energy travelling on main transmission line 600.

In exemplary embodiments of channel-selective power measurement circuit 400 having a directional coupler 301, directional coupler 301 samples the energy on main transmission line 600 (RF voltage) travelling in the forward and reflected directions, and provides a sample of the energy travelling in the forward direction and a sample of energy travelling in the reflected direction to channel-selective power measurement circuit 400. Channel-selective power measurement circuit 400 receives the sample of energy from directional coupler 301 and produces an output which is representative of the energy travelling in the forward direction and an output which is representative of the energy travelling in the reflected direction on main transmission line 600 for the channel or channels of interest.

Power measurement circuit 400 receives the frequency-compensated sample of forward energy and the frequency-compensated sample of reflected energy from directional coupler 301 and produces an output which is representative of the forward energy travelling on main transmission line 600 and an output which is representative of the reflected energy travelling on main transmission line 600.

In some exemplary embodiments, power measurement circuit 400 can measure the power of the baseband signal for the channel or channels of interest directly, such as with a diode or thermal device. In other exemplary embodiments, power measurement circuit 400 can digitize the baseband signal and use the digital data to calculate RF energy information for the energy travelling on main transmission line 600 for the channel or channels of interest.

In exemplary embodiments of channel-selective RF power sensor 100 having a non-directional coupler 302, power measurement circuit 400 can use the digital data to calculate RF energy information for the energy travelling on main transmission line 600 for the channel or channels of interest (channel or channels being measured). In exemplary embodiments of channel-selective RF power sensor 100 having a directional coupler 301, power measurement circuit 400 can use the digital data to calculate RF energy information for the energy travelling in the forward direction and also separately calculate RF energy information for the energy travelling in the reflected direction on main transmission line 600 for the channel or channels of interest (channel or channels being measured). The RF energy information can include various measurements of the energy travelling on main transmission line 600, including, but not limited to, RMS power, peak power, duty cycle, crest factor, VSWR, and other statistics that a person having ordinary skill in the art may find of interest, including, but not limited to complementary cumulative distribution function, peak, average, peak-to-average ratio, rise time, fall time, and pulse width. When coupler 300 is a directional coupler 301, the RF energy information can also be provided for the forward power and reflected power of the channel being measured, including, but not limited to forward RMS power, reflected RMS power, forward peak power, reflected peak power.

Figure 5:
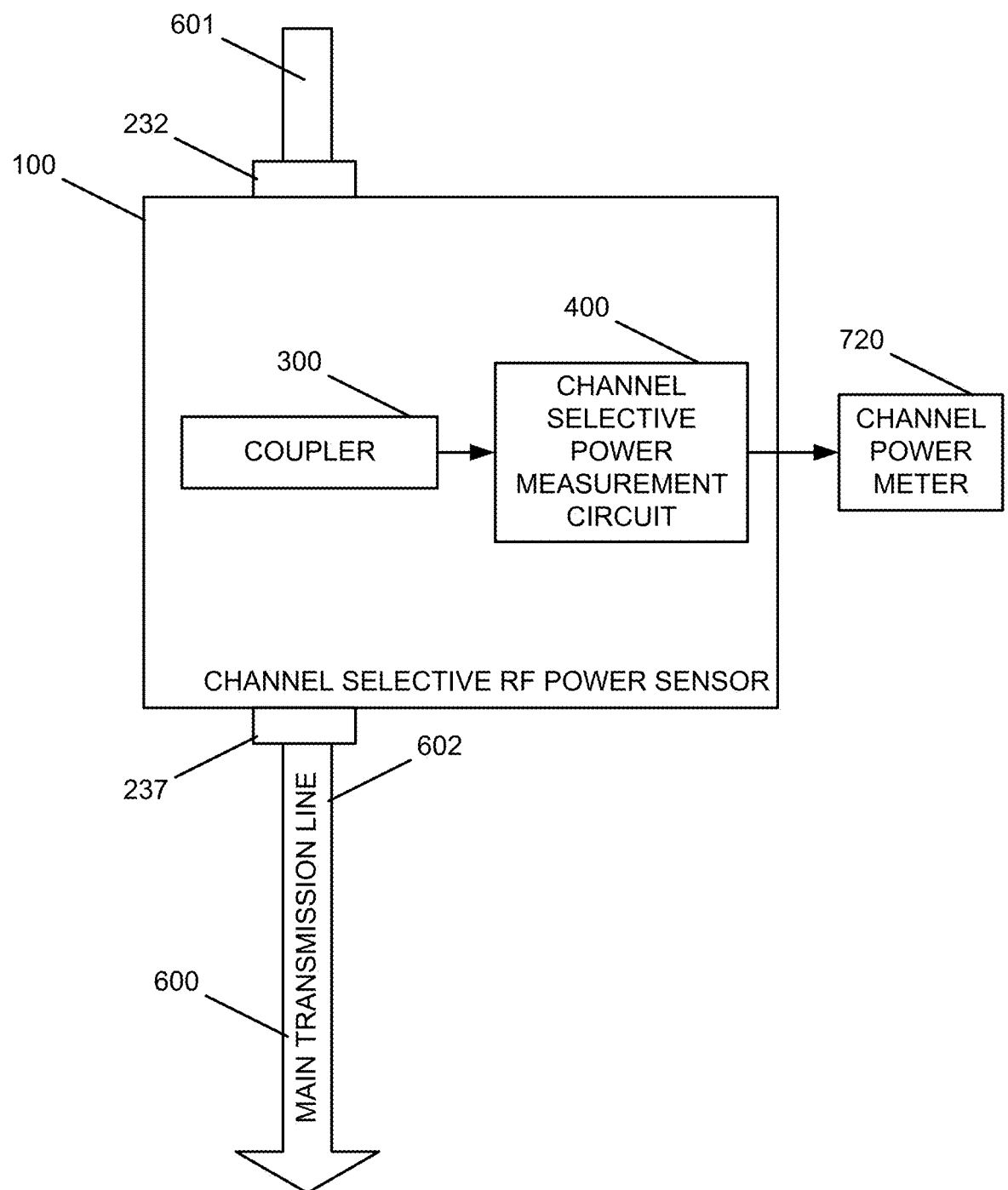
FIG. 5 is a block diagram of channel-selective RF power sensor in accordance with an exemplary embodiment of the invention.
Figure 6:
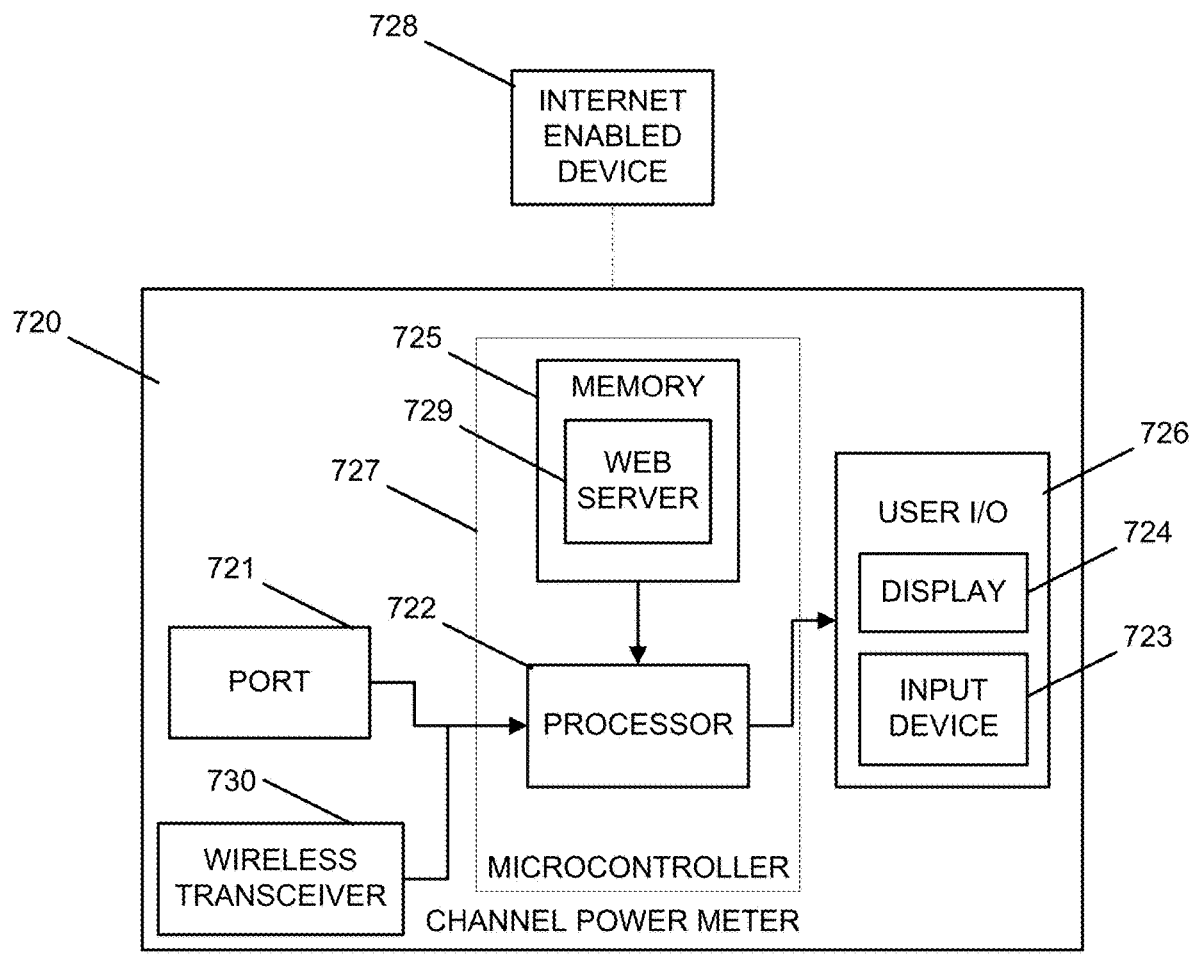
FIG. 6 is a block diagram of a channel power monitor in accordance with an exemplary embodiment of the invention.

Turning to FIGS. 5 and 6, FIG. 6 is a block diagram of channel power meter 720 in accordance with an exemplary embodiment of the invention. The RF energy information is provided by power measurement circuit 400 of channel-selective RF power sensor 100 to channel power meter 720. Channel power meter 720 which includes port 721, User I/O 726, wireless transceiver 730, and microcontroller 727 with a processor 722 and memory 725. User I/O 726 can include one or both of user input device 723 and display 724. In some exemplary embodiments, display 724 and user input device 723 of user I/O 726 can be combined, such as a touch screen. Further, user I/O 726 can have a separate display 724 and user input device 723. In other exemplary embodiments, user input device 723 can be buttons, a keypad or keyboard. Channel power meter microcontroller 727 is electrically connected to port 721, display 724, memory 725, and user I/O 726. In some exemplary embodiments, processor 722 and memory 725 of channel power meter microcontroller 727 are configured to host a webserver 729 that can be accessed through port 721 or wireless transceiver 730 by internet enabled devices 728, such as a cell phone or computer.

In one exemplary embodiment, channel power meter 720 and channel-selective RF power sensor 100 communicate using serial communication, such, but not limited to, RS-485. It is contemplated that a person having ordinary skill in the art can choose to configure channel-selective RF power sensor 100 and channel power meter 720 to communicate using another method and/or protocol. Further, channel power meter 720 and internet enabled device 728 can communicate via a wired connection also through port 721, or can communicate via wireless communication through wireless transceiver 730, or a combination of the two.

Channel power meter 720 can use the RF energy information provided by power channel-selective RF power sensor 100 to obtain additional RF energy information, such as by measurement and/or calculation. This additional RF energy information can include combiner losses by channel, multi-coupler gain by channel, antenna degradation (loss) by channel, transmission system degradation (loss) by channel, and channel-to-channel measurements and comparisons. Channel power meter 720 can provide the RF energy information to a user, such as through the display 724 of user I/O 726 or a web browser that accesses a webserver 729 running on channel power meter 720. Channel power meter 720 also allows a user to select the center frequency and width of the channel or channels of interest (channel or channels being measured) that channel-selective RF power sensor 100 will measure and obtain RF energy information for. The user can make the center frequency and bandwidth selections for the channel or channels of interest (channel or channels being measured), such as through the user input device 723 and display 724 of user I/O 726 or a web browser. Channel power meter 720 then communicates the center frequency and bandwidth selections for the channel or channels to be measured (channel or channels of interest) to channel-selective RF power sensor 100, and channel-selective RF power sensor 100 configures the oscillator and filters of channel-selective power measurement circuit 400 to measure the channel or channels of interest.

Figure 7:
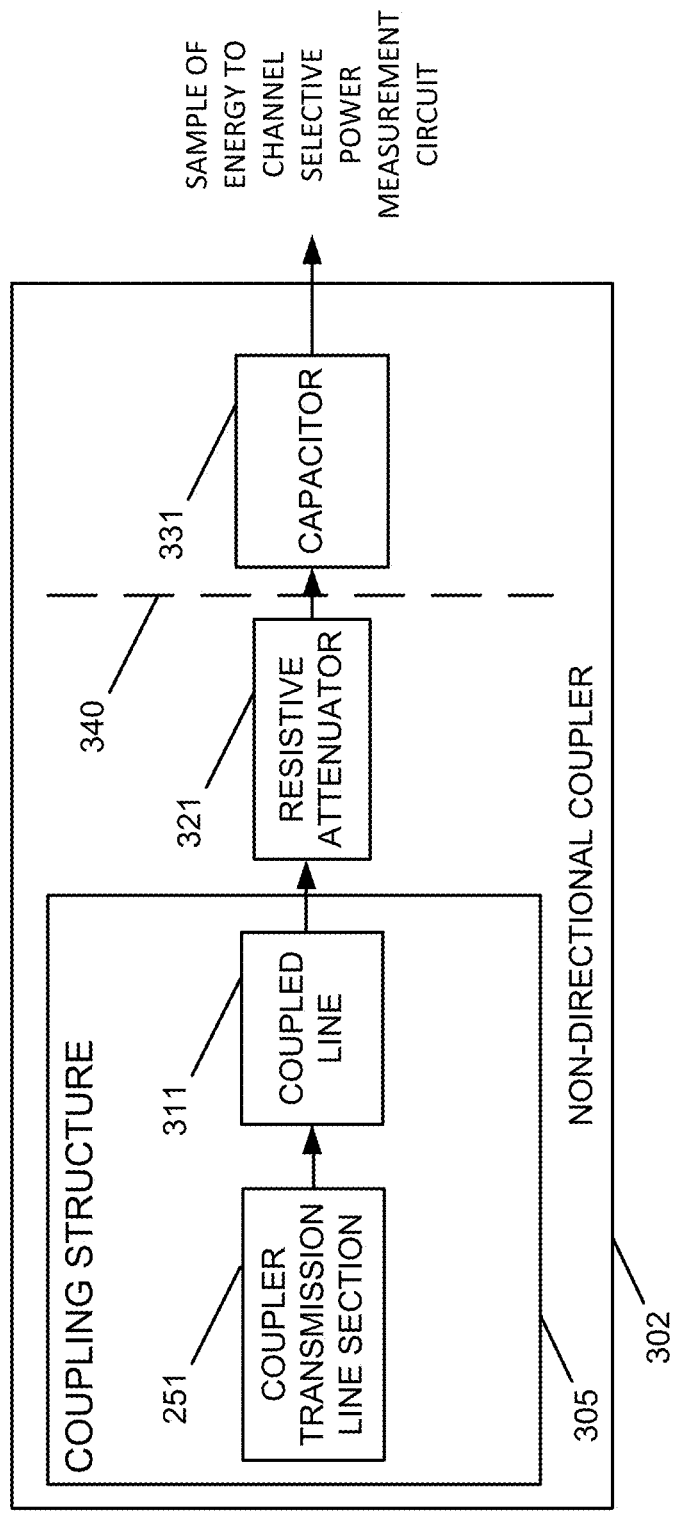
FIG. 7 is a block diagram of a non-directional coupler of channel-selective RF power sensor in accordance with an exemplary embodiment of the invention.

FIG. 7 is a block diagram of non-directional coupler 302 in accordance with an exemplary embodiment of the invention. Non-directional coupler 302 samples the energy on main transmission line 600 (RF voltage) and provides a processed sample of energy (sample of energy) to power measurement circuit 400.

Non-directional coupler 302 has coupling structure 305, resistive attenuator 321, capacitor 331, and via wall 340. Coupling structure 305 has coupler transmission line section 251 and coupled line 311. Coupler transmission line section 251 is electrically connected to coupled line 311, coupled line 311 is electrically connected to resistive attenuator 321, and resistive attenuator 321 is electrically coupled to capacitor 331. In some exemplary embodiments, via wall 340 is located between resistive attenuator 321 and capacitor 331. In exemplary embodiments of channel-selective RF power sensor 100 having non-directional coupler 302, capacitor 331 is electrically connected, and provides a sample of energy to variable gain stage 411 of channel-selective power measurement circuit 400.

Coupler transmission line section 251 is electrically connectable to the main transmission line 600 through upstream connector 232 and downstream connector 237. When coupler transmission line section 251 is electrically connected to the main transmission line 600, the energy flowing between the upstream end 601 and downstream end 602 of main transmission line 600 passes through coupler transmission line section 251 of coupling structure 305.

Coupler transmission line section 251 is configured to couple with coupled line 311, obtain a sample of the energy on main transmission line 600 (RF voltage), provide the sample of energy to the resistive attenuator 321. Coupling structure 305 of non-directional coupler 302 is configured to obtain a sample of the energy on main transmission line 600 (RF Voltage) using coupling structure 305 and provide a sample of the energy travelling on main transmission line 600 to resistive attenuator 321.

Resistive attenuator 321 receives the sample of energy travelling on main transmission line 600 produced by coupling structure 305 (sample of energy). Resistive attenuator 321 attenuates the sample of energy (RF voltage) received from coupling structure 305 by setting the voltage level of the sample of energy to a level appropriate for the capacitor 331. Resistive attenuator 321 outputs the attenuated sample of energy to capacitor 331. Resistive attenuator 321 also provides isolation between the circuit components of the coupling structure 305 and the remainder of the circuit components of the channel-selective RF power sensor 100, such as the capacitor 331 and the power measurement circuit 400.

Accordingly, resistive attenuator 321 is configured to receive the sample of energy travelling (RF power) on main transmission line 600 (sample of energy) and convert the sample of energy to an attenuated sample of energy (RF voltage) representative of the energy travelling on main transmission line 600.

Capacitor 331 receives the attenuated sample of energy from resistive attenuator 321, processes the attenuated sample of energy, and outputs the processed sample of energy to variable gain stage 411 of power measurement circuit 400.

In one exemplary embodiment, capacitor 331 processes the attenuated sample of energy by carrying out one or more of flattening the frequency response, reducing the signal level (voltage division), and reducing the impedance seen by variable gain stage 411.

Figure 8:
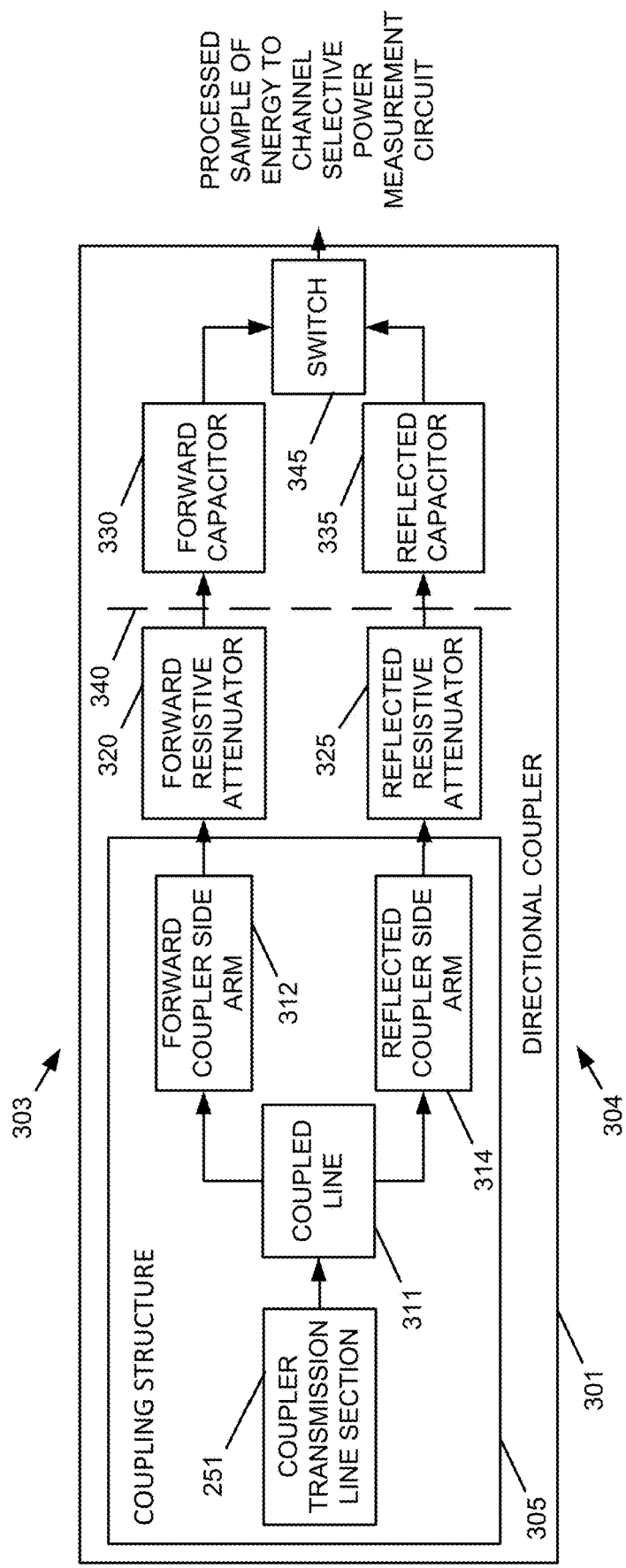
FIG. 8 is a block diagram of a directional coupler of channel-selective RF power sensor in accordance with an exemplary embodiment of the invention.

FIG. 8 is a block diagram of a directional coupler 301 in accordance with an exemplary embodiment of the invention. Directional coupler 301 samples the energy on main transmission line 600 (RF voltage) and provides a processed sample of energy travelling in the forward direction (sample of forward energy) and a processed sample of energy travelling in the reflected direction (sample of reflected energy) to power measurement circuit 400.

Directional coupler 301 has coupling structure 305, forward resistive attenuator 320, forward capacitor 330, reflected resistive attenuator 325, reflected capacitor 335, via wall 340, and switch 354. Coupling structure has coupler transmission line section 251, coupled line 311, forward coupler side arm 312, and reflected coupler side arm 314.

Coupler transmission line section 251 is electrically connected to coupled line 311, which has a forward coupler side arm 312 and a reflected coupler side arm 314. The forward coupler side arm 312 is electrically connected to forward resistive attenuator 320. Forward resistive attenuator 320 is electrically connected to forward capacitor 330. Forward capacitor 330 is electrically connected to switch 345. The reflected coupler side arm 314 is electrically connected to the reflected resistive attenuator 325. The reflected resistive attenuator 325 is electrically connected to the reflected capacitor. The reflected capacitor 335 is electrically connected to switch 345.

Figure 2:
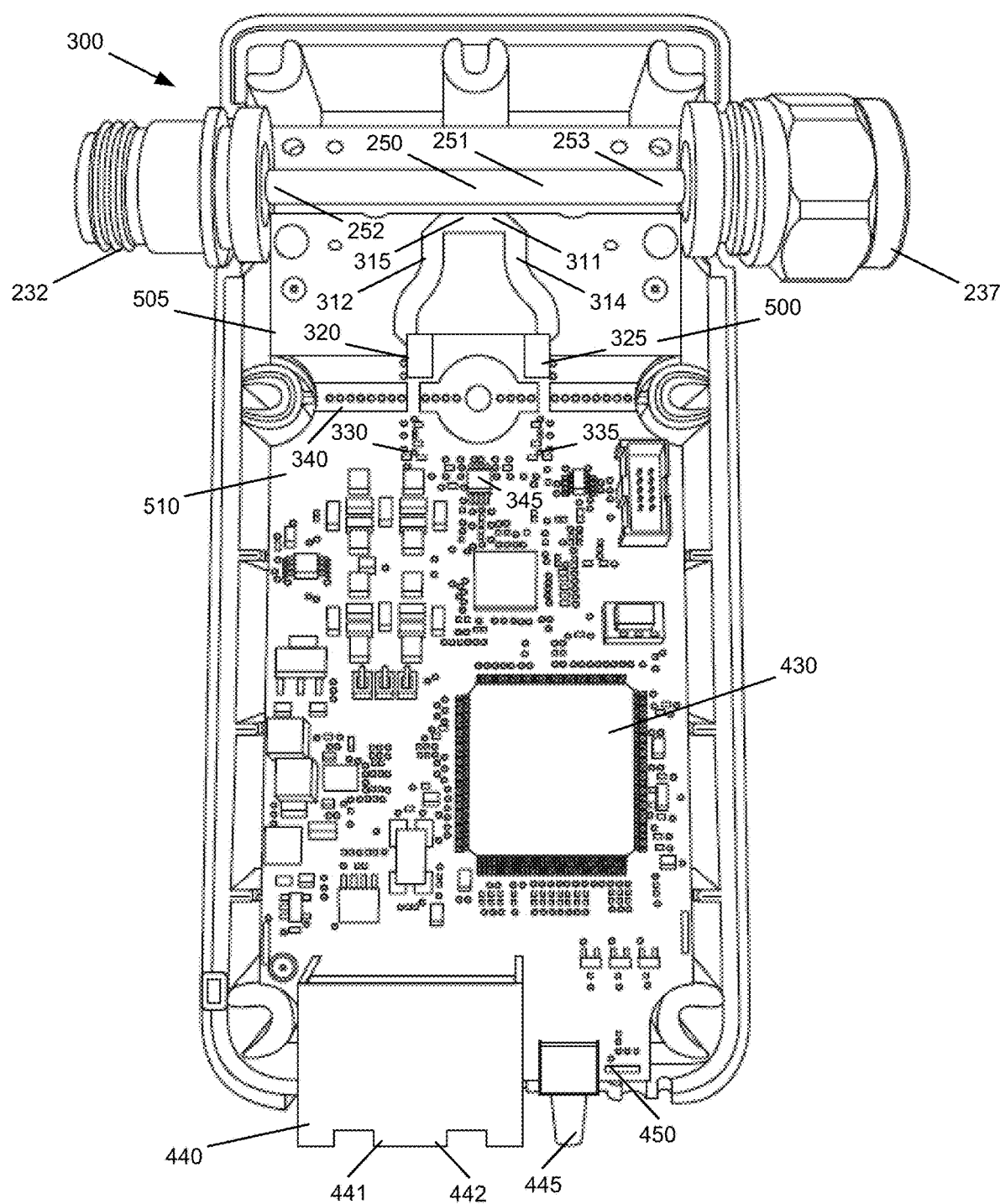
FIG. 2 is an overhead view of channel-selective RF power sensor with upper portion of carrier body removed in accordance with an exemplary embodiment of the invention.
Figure 3:
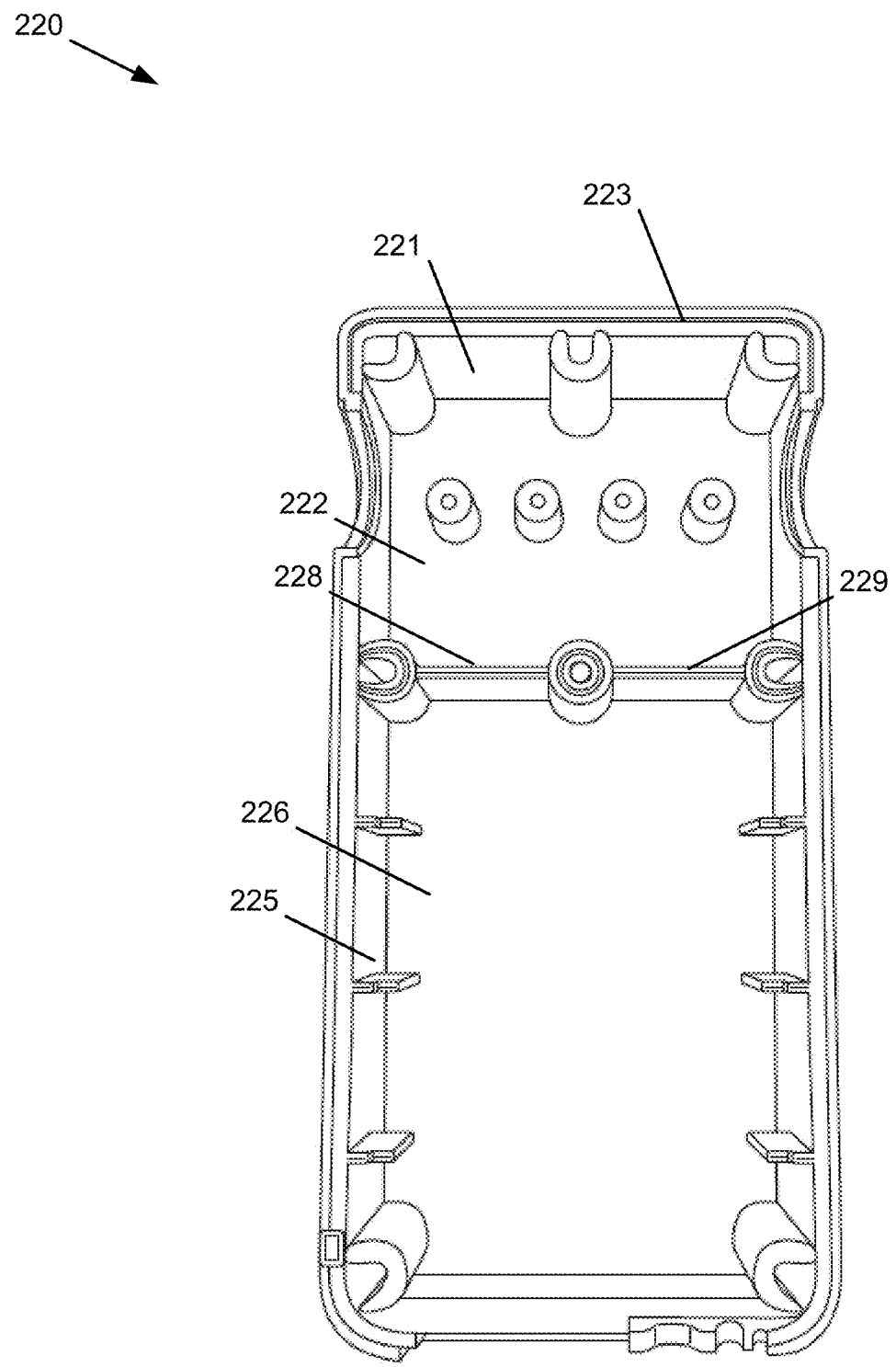
FIG. 3 is an overhead view of a lower portion of channel-selective RF power sensor carrier body in accordance with an exemplary embodiment of the invention.
Figure 4:
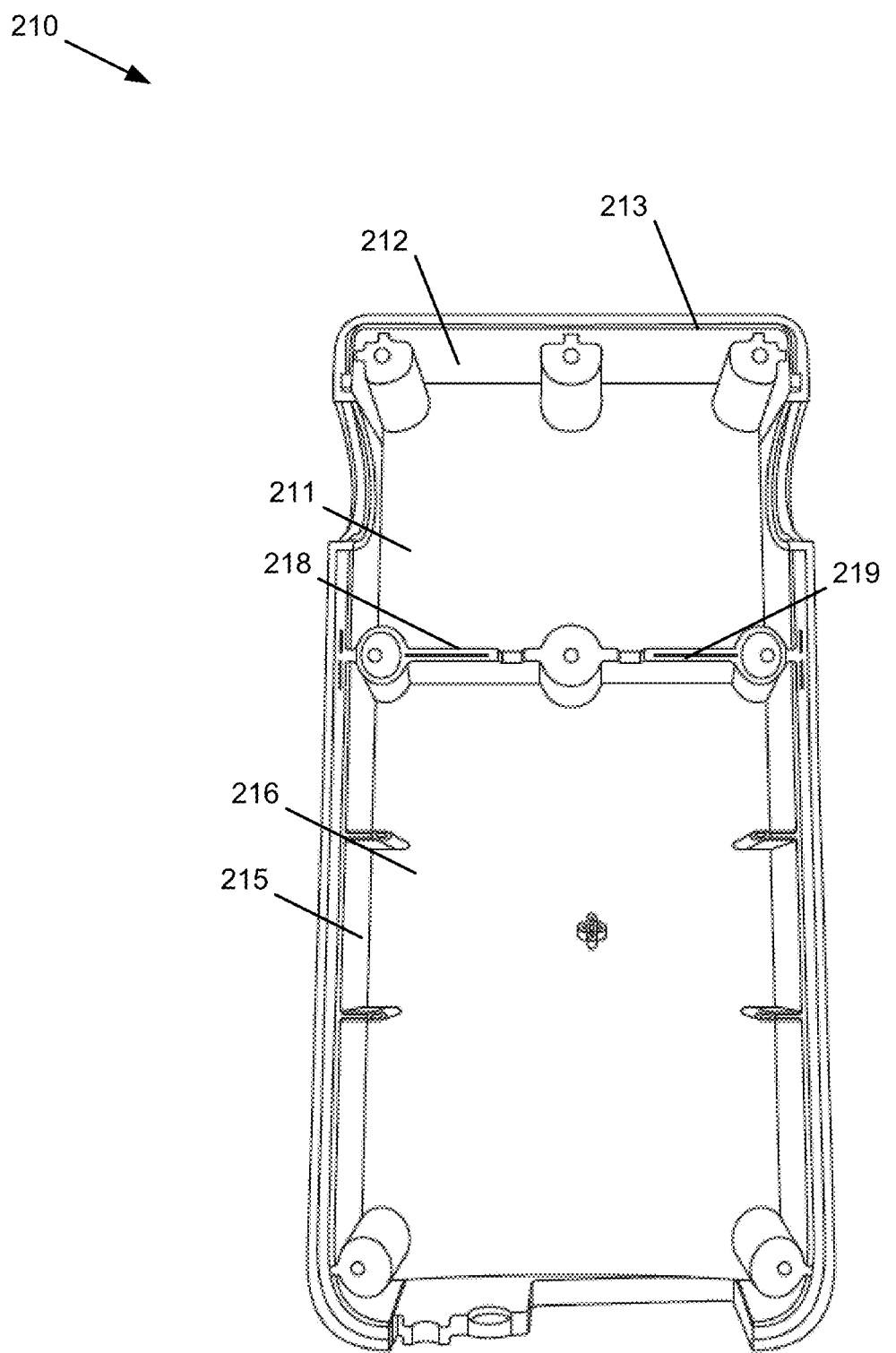
FIG. 4 is an overhead view of an upper portion of RF power sensor carrier body in accordance with an exemplary embodiment of the invention.

As can be seen in FIG. 2, coupled line 311 has a central portion 315 that runs parallel to coupler transmission line section 251, a forward coupler side arm 312 connected at an upstream end of central portion 315, and a reflected coupler side arm 314 connected at a downstream end of central portion 315.

In exemplary embodiments of channel-selective RF power sensor 100 having directional coupler 301, switch 345 is electrically connected to and provides a sample of forward energy to variable gain stage 411 of channel-selective power measurement circuit 400 when in the forward position and provides a sample of reflected energy to variable gain stage 411 when in the reflected position.

Coupling structure 305, forward resistive attenuator 320, and reflected resistive attenuator 325 are located on an upstream side of via wall 340. Forward capacitor 330 and reflected capacitor 335 are located on a downstream side of via wall 340. Forward resistive attenuator 320 provides isolation between coupling structure 305 and forward capacitor 330. Forward capacitor 330 would harm the directivity of coupling structure 305, if forward resistive attenuator 320 did not isolate coupling structure 305 from forward capacitor 330. Reflected resistive attenuator 325 provides isolation between coupling structure 305 and reflected capacitor 335. Reflected capacitor 335 would harm the directivity of coupling structure 305, if reflected resistive attenuator 325 did not isolate coupling structure 305 from reflected capacitor 335.

Directional coupler 301 is electrically connectable to the main transmission line 600 through upstream connector 232 and downstream connector 237. Coupling structure 305 has coupler transmission line section 251 and coupled line 311. When coupler transmission line section 251 is electrically connected to the main transmission line 600, the energy flowing between the upstream end 601 and downstream end 602 of main transmission line 600 passes through coupler transmission line section 251 of coupling structure 305.

Coupler transmission line section 251 is configured to couple with coupled line 311, obtain a sample of the energy on main transmission line 600 (RF voltage), provide the sample of energy to the resistive attenuator 321. Coupling structure 305 of non-directional coupler 302 is configured to obtain a sample of the energy on main transmission line 600 (RF Voltage) using coupling structure 305 and provide a sample of the energy travelling in the forward direction on main transmission line 600 to forward resistive attenuator 320 and a sample of the energy travelling in the reflected direction to reflected resistive attenuator 325.

The forward coupler side arm 312 is electrically connected to the forward resistive attenuator 320. The forward coupler side arm 312 is configured to provide the sample of energy travelling in the forward direction to the forward resistive attenuator 320. Accordingly, forward coupler side arm 312 is configured to receive the sample of energy travelling in the forward direction on main transmission line 600 from coupled line 311, and provide to forward resistive attenuator 320 the sample of energy travelling in the forward direction on main transmission line 600 (sample of forward energy).

The reflected coupler side arm 314 is electrically connected to the reflected resistive attenuator 325. The reflected coupler side arm 314 is configured to provide the sample of energy travelling in the reflected direction on main transmission line 600 to the reflected resistive attenuator 325. Accordingly, reflected coupler side arm 314 is configured to receive the sample of energy travelling in the reflected direction on main transmission line 600 from coupled line 311, and provide to reflected resistive attenuator 325 the sample of energy travelling in the reflected direction on main transmission line 600 (sample of reflected energy).

Forward resistive attenuator 320 receives the sample of energy travelling in the forward direction on main transmission line 600 produced by coupling structure 305 (sample of forward energy). Forward resistive attenuator 320 attenuates the sample of energy travelling in the forward direction (RF voltage) received from coupling structure 305 by setting the voltage level of the sample of forward energy to a level appropriate for the forward capacitor 330. Forward resistive attenuator 320 outputs the attenuated sample of forward energy to forward capacitor 330. Forward resistive attenuator 320 also provides isolation between the circuit components of the coupling structure 305 and the remainder of the circuit components of the channel-selective RF power sensor 100, such as the forward capacitor 330, switch 345, and the power measurement circuit 400.

Accordingly, forward resistive attenuator 320 is configured to receive the sample of energy travelling in the forward direction (RF power) on main transmission line 600 (sample of forward energy) and convert the sample of forward energy to an attenuated sample of forward energy (RF voltage) representative of the forward energy travelling on main transmission line 600.

Reflected resistive attenuator 325 receives the sample of energy travelling in the reflected direction on main transmission line 600 produced by coupling structure 305 (sample of reflected energy). Reflected resistive attenuator 325 attenuates the sample of energy travelling in the reflected direction (RF voltage) received from coupling structure 305 by setting the voltage level of the sample of reflected energy to a level appropriate for the reflected capacitor 335. Reflected resistive attenuator 325 outputs the attenuated sample of reflected energy to reflected capacitor 335. Reflected resistive attenuator 325 also provides isolation between the circuit components of the coupling structure 305 and the remainder of the circuit components of the channel-selective RF power sensor 100, such as the reflected capacitor 335, switch 345, and the channel-selective power measurement circuit 400.

Accordingly, reflected resistive attenuator 325 is configured to receive the sample of energy travelling in the reflected direction (RF power) on main transmission line 600 (sample of reflected energy) and convert the sample of reflected energy to an attenuated sample of reflected energy (RF voltage) representative of the reflected energy travelling on main transmission line 600.

Forward capacitor 330 receives the attenuated sample of forward energy from forward resistive attenuator 320, processes the attenuated sample of forward energy, and outputs the processed sample of forward energy to switch 345.

In one exemplary embodiment, forward capacitor 330 processes the attenuated sample of forward energy by carrying out one or more of flattening the frequency response, reducing the signal level (voltage division), and reducing the impedance seen by switch 345.

Reflected capacitor 335 receives the attenuated sample of reflected energy from reflected resistive attenuator 325, processes the attenuated sample of reflected energy, and outputs the processed sample of reflected energy to switch 345.

In one exemplary embodiment, reflected capacitor 335 processes the attenuated sample of reflected energy by carrying out one or more of flattening the frequency response, reducing the signal level (voltage division), and reducing the impedance seen by switch 345.

Switch 345 receives the processed sample of forward energy and processed sample of reflected energy. Switch 345 has a forward position and a reflected position. Switch 345 passes the processed sample of forward energy received from forward capacitor 330 to variable gain stage 411 of channel-selective power measurement circuit 400, when switch 345 is in the forward position. Switch 345 passes the processed sample of reflected energy received from reflected capacitor 335 to variable gain stage 411 of channel-selective power measurement circuit, when switch 345 is in the reflected position. The position of switch 345 is controlled by signal processing microcontroller 430 of channel-selective power measurement circuit 400. More specifically, signal processing microcontroller 430 sends an output that is received by switch 345 that places switch 345 in a forward position/state or a reflected position/state.

Figure 9:
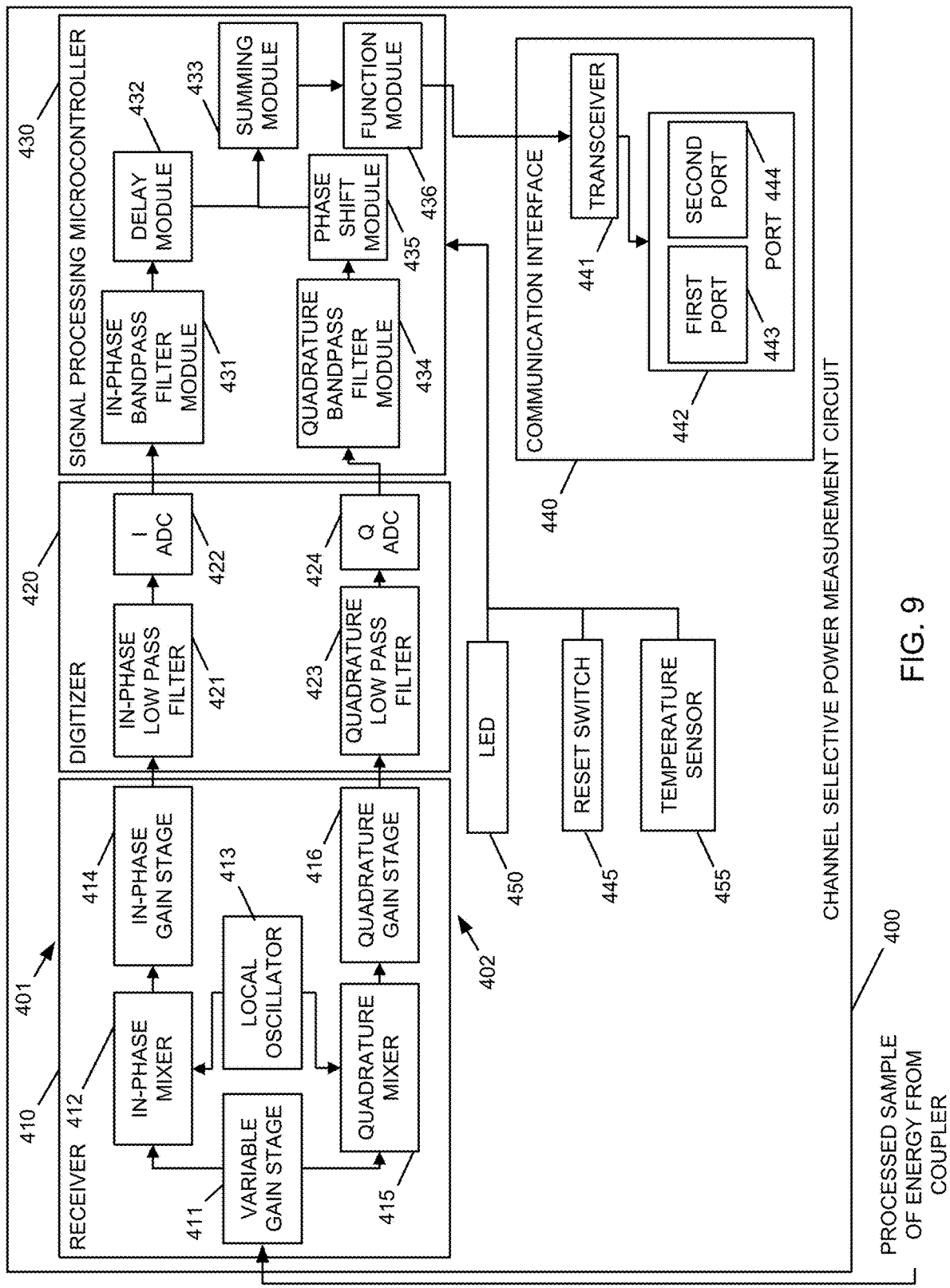
FIG. 9 is a block diagram of a channel-selective power measurement circuit of channel-selective RF power sensor in accordance with an exemplary embodiment of the invention.

FIG. 9 is a block diagram of channel-selective power measurement circuit 400 of channel-selective RF power sensor 100 in accordance with an exemplary embodiment of the invention. Channel-selective power measurement circuit 400 receives a processed sample of energy from coupler 300 and provides an output of RF energy information which is measurements of and statistics for the energy travelling on main transmission line 600 for a channel being measured. The center frequency and bandwidth of the channel being measured is user selectable through and provided to channel-selective RF power sensor 100 by channel power meter 720. The processed sample of energy can include the processed sample of forward energy and the processed sample of reflected energy on main transmission line 600, when coupler 300 is a directional coupler 301. The processed sample of energy is representative of the non-directional potential (voltage) that exists between the inner and outer conductors of the main transmission line 600, when coupler 300 is a non-directional coupler.

Channel-selective power measurement circuit 400 has a receiver 410, digitizer 420, signal processing microcontroller 430, communication interface 440, reset switch 445, LED 450, and temperature sensor 455. Receiver 410 receives the processed sample of energy from coupler 300, down-converts the processed sample of energy to baseband or a low intermediate frequency, and provides an in-phase sample of energy and a quadrature sample of energy to digitizer 420. Digitizer 420 receives the amplified in-phase sample of energy and an amplified quadrature sample of energy from receiver 410 and provides a digitized in-phase sample of energy and a digitized quadrature sample of energy to signal processing microcontroller 430. Signal processing microcontroller 430 receives the digitized in-phase sample of energy and digitized quadrature sample of energy from digitizer 420 and provides RF energy information for a channel being measured to communication interface 440. Communication interface 440 receives RF energy information from signal processing microcontroller 430 and provides an output of the RF energy information for a channel being measured from channel-selective power measurement circuit 100. Stated alternatively, communication interface 440 receives RF energy information from signal processing microcontroller 430 and provides an output of the RF energy information for a channel being measured to channel power meter 720.

Receiver 412 has a variable gain stage 411, in-phase mixer 412, local oscillator 413, in-phase gain stage 414, quadrature mixer 415, and quadrature gain stage 416. Variable gain stage 411 receives the processed sample of energy from coupler 300, applies a gain to the processed sample of energy such that the processed sample of energy is amplified to a level sufficient for mixing, and provides the amplified sample of energy to the in-phase mixer 412 and quadrature mixer 415. The gain applied by variable gain stage 411 is set by signal processing microcontroller 430 after retrieving from memory 438. In some exemplary embodiments, the gain value for variable gain stage 411 that is stored in memory 438 and set by microcontroller 430 can be provided by a user, such as through channel power meter 720. In other exemplary embodiments, the gain value for variable gain stage 411 can be stored in memory 438 at the factory. In other exemplary embodiments, the gain value can be stored in memory 438 at the time of commissioning. In additional exemplary embodiments, the gain value for variable gain stage 411 stored in memory 438 can be dynamically determined and adjusted by signal processing microcontroller 430. In some exemplary embodiments, the gain value for variable gain stage 411 stored in memory 438 can be dynamically determined and adjusted by signal processing microcontroller 430, such as based upon the in-phase digitized sample of energy value and/or quadrature digitized sample of energy value. In other exemplary embodiments, the dynamic adjustment of the gain value of variable gain stage 411 is based on a relationship between the input amplitude of the processed sample of energy received by variable gain stage 411 and the gain value of variable gain stage 411. In some exemplary embodiments, the gain value of variable gain stage 411 is dynamically determined and adjusted based upon the input amplitude of the processed sample of energy received by variable gain stage 411 from coupler 300. It is contemplated that in some exemplary embodiments, a gain stage with a fixed gain can be used in place of variable gain stage 411.

In-phase mixer 412 receives the amplified sample of energy from the variable gain stage 411 and mixes the amplified sample of energy with an in-phase local oscillator signal received from local oscillator 413, thereby producing an in-phase sample of energy that is provided to in-phase gain stage 414. In-phase gain stage 414 receives the in-phase sample of energy from in-phase mixer 412, amplifies the in-phase sample of energy to a level sufficient for filtering by in-phase low pass filter 421, thereby producing an amplified in-phase sample of energy that is provided to in-phase low pass filter 421 of digitizer 420.

Quadrature mixer 415 receives the amplified sample of energy from the variable gain stage 411 and mixes the amplified sample of energy with a quadrature local oscillator signal received from local oscillator 413, thereby producing a quadrature sample of energy that is provided to quadrature gain stage 416. Quadrature gain stage 416 receives the quadrature sample of energy from quadrature mixer 415, amplifies the quadrature sample of energy to a level sufficient for filtering by quadrature low pass filter 423, thereby producing an amplified quadrature sample of energy that is provided to quadrature low pass filter 423 of digitizer 420.

The frequency of the in-phase signal produced by local oscillator 413 is set equal to the center frequency of the channel being measured. In some exemplary embodiments, the frequency of the in-phase signal produced by local oscillator 413 can be offset from the center frequency stored in memory 438 by processor 437 to optimize image rejection performance of the circuit. Stated alternatively, in some embodiments, the frequency of local oscillator 413 can be offset from the center frequency stored in memory 438 by processor 437 to optimize image rejection performance of the channel-selective power measurement circuit 400. Accordingly, the local oscillator 413 is programmed based on the center frequency of the channel being measured. The quadrature signal produced by local oscillator 413 has the same frequency as the in-phase signal produced by local oscillator 413, but is 90 degrees out of phase from the in-phase signal produced by local oscillator 413. The value of the center frequency is received from and set by signal processing microcontroller 430. The value of the center frequency is user selectable and provided to signal processing microcontroller 430 by the user. In an exemplary embodiment of channel-selective RF power sensor 100, the user selects the center frequency value using the channel power meter 720, which then provides the center frequency value selected by the user to the signal processing microcontroller 430. The signal processing microcontroller 430 stores the center channel frequency value in memory 438 and sets the value of the frequency of the local oscillator 413 such that the frequency of the in-phase signal and quadrature signal produced by local oscillator 413 have a frequency that is equal to the center frequency of the channel being measured and the quadrature signal produced by local oscillator 413 is 90 degrees out of phase from the in-phase signal produced by local oscillator 413. However, in some exemplary embodiments, the frequency of local oscillator 413 can be offset from the center frequency stored in memory 438 by processor 437 to optimize image rejection performance of the circuit. Stated alternatively, in some embodiments, the frequency of local oscillator 413 can be offset from the center frequency stored in memory 438 by processor 437 to optimize image rejection performance of the channel-selective power measurement circuit 400. Accordingly, the local oscillator 413 is programmed based on the center frequency of the channel being measured.

In-phase low pass filter 421 receives the amplified in-phase sample of energy from in-phase gain stage 414 and filters (rejects) any unwanted image products from the amplified in-phase sample of energy, thereby producing a filtered in-phase sample of energy that is provided to the in-phase analog to digital converter (ADC) 422. In-phase ADC 422 receives the filtered in-phase sample of energy from the in-phase low pass filter 421 and digitizes the filtered in-phase sample of energy, thereby producing a digitized in-phase sample of energy that is provided to the in-phase bandpass filter module 431 of signal processing microcontroller 430.

Quadrature low pass filter 423 receives the amplified quadrature sample of energy from quadrature gain stage 416 and filters (rejects) any unwanted mixer products from the amplified quadrature sample of energy, thereby producing a filtered quadrature sample of energy that is provided to the quadrature analog to digital converter (ADC) 424. Quadrature ADC 424 receives the filtered quadrature sample of energy from the quadrature low pass filter 423 and digitizes the filtered quadrature sample of energy, thereby producing a digitized quadrature sample of energy that is provided to the quadrature bandpass filter module 434 of signal processing microcontroller 430.

In-phase bandpass filter module 431 receives the digitized in-phase sample of energy from in-phase ADC 422 and applies a bandpass filter to pass only those signals within the channel being measured, thereby producing a filtered digitized in-phase sample of energy that is provided to delay module 432. Quadrature bandpass filter module 434 receives the digitized quadrature sample of energy from quadrature ADC 424 and applies a bandpass filter to pass only those signals within the channel being measured, thereby producing a filtered digitized quadrature sample of energy that is provided to phase shift module 435. In an exemplary embodiment, in-phase bandpass filter module 431 and quadrature bandpass filter module 434 are finite impulse response (FIR) filters, however, it is contemplated that they can be implemented using a different type of bandpass filter.

Accordingly, in-phase bandpass filter module 431 and quadrature bandpass filter module 434 act as channel selection filters with configurable coefficients, such that the bandwidth of in-phase bandpass filter module 431 and quadrature bandpass filter module 434 are each equal to the bandwidth of the channel being measured. The values of the coefficients of in-phase bandpass filter module 431 and quadrature bandpass filter module 434 are retrieved from a lookup table in memory 438 and set by signal processing microcontroller 430. The values for the coefficients retrieved from the lookup table in memory 438 are based on the channel width of interest selected by the user and provided to microcontroller 430. In an exemplary embodiment of channel-selective RF power sensor 100, the user selects the bandwidth of the channel being measured using the channel power meter 720, which then provides the bandwidth channel value selected by the user to the signal processing microcontroller 430. The signal processing microcontroller 430 retrieves the corresponding values for the bandpass filter coefficients from memory 438, and sets the values of the coefficients of in-phase bandpass filter module 431 and quadrature bandpass filter module 434 equal to the lookup table coefficient values retrieved from memory 438.

In some exemplary embodiments of channel-selective RF power sensor 100, the digital bandpass filter of the in-phase bandpass filter module 431 could be implemented as an analog bandpass filter placed before the in-phase ADC 422 and/or the digital bandpass filter of the quadrature bandpass filter module 434 could be implemented as an analog bandpass filter placed before the quadrature ADC 424.

The filtered digitized quadrature sample of energy is received by the phase shift module 435 from quadrature bandpass filter module 434. Phase shift module 435 applies an additional 90 degree phase shift to the filtered digitized quadrature sample of energy, thereby producing a shifted digitized quadrature sample of energy that is provided to summing module 433. The filtered digitized in-phase sample of energy is received by the delay module 432 from in-phase bandpass filter module 431. A delay is applied to the filtered digitized in-phase sample of energy, producing a delayed digitized in-phase sample of energy that arrives and provided to summing module 433. The duration of the delay applied by delay module 432 to filtered digitized in-phase sample of energy is equivalent to the length of time it takes for phase shift module 435 to apply the additional 90 degree phase shift to the filtered digitized quadrature sample of energy, thereby ensuring that the shifted digitized quadrature sample of energy and the delayed digitized in-phase sample of energy simultaneously arrive at the summing module 433. In some exemplary embodiments, phase shift module 435 applies the additional 90 degree phase shift to the filtered digitized quadrature sample of energy using a Hilbert transform.

Summing module 433 simultaneously receives shifted digitized quadrature sample of energy from phase shift module 435 and the delayed digitized in-phase sample of energy from delay module 432. Summing module 433 sums the shifted digitized quadrature sample of energy and the delayed digitized in-phase sample of energy together to produce a summed sample of energy that is provided to the function module 436. When the shifted digitized quadrature sample of energy and the delayed digitized in-phase sample of energy are summed together by summing module 433, the remaining image frequencies are rejected. More specifically, the desired signals add constructively, and the undesired image adds destructively, thereby leaving only the desired signal in the resulting summed sample of energy produced by summing module 433.

Function module 436 receives and applies various mathematical functions to the summed sample of energy produced by summing module 433, thereby producing RF energy information for the channel being measured on main transmission line 600. Function module 436 also applies a temperature correction and a calibration correction factor to the RF energy information.

The output of the circuitry of channel-selective RF power sensor 100 varies with the ambient temperature. Signal processing microcontroller 430 uses the temperature level output of temperature sensor 455 in conjunction with a temperature characterization curve stored in memory 438 to compensate for the effects of thermally induced drift in various components of channel-selective RF power sensor 100. In some exemplary embodiments, function module 436 of signal processing microcontroller 430 uses the temperature level output of temperature sensor 455 in conjunction with a temperature characterization curve stored in memory 438 to compensate for the effects of thermally induced drift in various components of channel-selective RF power sensor 100.

Further, signal processing microcontroller 430 uses a calibration correction factor to help attain good absolute accuracy of the RF power measured by channel-selective RF power sensor 100 to a NIST traceable standard. The calibration correction factor corrects for any static variation from channel-selective RF power sensor 100 to channel-selective RF power sensor 100 in areas such as, but not limited to, coupling levels, losses, and amplifier gain. The calibration correction factor for RF power sensor 100 can be determined by the factory at the time of manufacture and stored in memory 438 of microcontroller 430. In an exemplary embodiment, function module 436 of signal processing microcontroller 430 uses the calibration correction factor to correct for any static variation from channel-selective RF power sensor 100 to channel-selective RF power sensor 100. Further, in some exemplary embodiments, multiple calibration correction factors could be stored in memory 438 and applied based on the signal path of the signal being acted upon by function module 436. For example, an in-phase calibration correction factor can be applied to a signal that travelled through the in-phase channel 401 of the channel-selective measurement circuit 400 and a quadrature calibration factor can be applied to a signal that travelled through the quadrature channel 402 of the channel-selective measurement circuit. Further, a forward power correction factor can be applied to a signal that travelled through the forward power channel 303 of directional coupler 301, a reflected power correction factor can be applied to a signal that travelled through the reflected power channel 304 of directional coupler 301, and a non-directional power correction factor can be applied to signal that travelled through non-directional coupler 302.

The temperature and calibration correction permit channel-selective RF power sensor 100 to be calibrated across temperature and frequency, so that channel-selective RF power sensor 100 provides accurate measurements under all conditions.

The forward power channel 303 of directional coupler 301 includes coupler transmission line section 251, coupled line 311, forward coupler side arm 312, forward resistive attenuator 320, forward capacitor 330, and switch 345. The reflected power channel 304 of directional coupler 301 includes coupler transmission line section 251, coupled line 311, reflected coupler side arm 314, reflected resistive attenuator 325, reflected capacitor 335, and switch 345. The in-phase channel 401 of channel-selective measurement circuit 400 includes variable gain stage 411, in-phase mixer 412, in-phase gain stage 414, in-phase low pass filter 421, in-phase ADC 422, in-phase bandpass filter module 431, delay module 432, summing module 433 and function module 436. The quadrature channel 402 of channel-selective measurement circuit 400 included variable gain stage 411, quadrature mixer 415, quadrature gain stage 416, quadrature low pass filter 423, quadrature ADC 424, quadrature bandpass filter module 434, phase shift module 435, summing module 433, and function module 436.

The RF energy information produced by function module 436 for the channel being measured is provided to transceiver 441 of communication interface 440. The transceiver 441 uses port 442 to make available and transmit the RF energy information for the channel being measured from the channel-selective power measurement circuit 400 of channel-selective RF power sensor 100. In some exemplary embodiments, The transceiver 441 uses first port 443 and second port 444 of port 442 to make available and transmit the RF energy information for the channel being measured from the channel-selective power measurement circuit 400 of channel-selective RF power sensor 100.

It is contemplated that in some exemplary embodiments of channel-selective RF power sensor 100, in-phase low pass filter 421, quadrature low pass filter 423, in-phase ADC 422 and/or quadrature ADC 424 could be implemented in receiver 410, instead of digitizer 420. Further, it is contemplated that in-phase ADC 422 and/or quadrature ADC 424 could be implemented in signal processor, instead of digitizer 420. Additionally, it is contemplated that transceiver 441 can be implemented in signal processing microcontroller 430, instead of communication interface 440.

Further, it is contemplated that in some exemplary embodiments of channel-selective RF power sensor 100, one or more of receiver 410, digitizer 420, and/or signal processing microcontroller 430 can be implemented using discrete components. It is contemplated that in some exemplary embodiments of channel-selective RF power sensor 100, that the elements of one or more of receiver 410, digitizer 420, and/or signal processing microcontroller 430 can be implemented using discrete components. It is contemplated that in some exemplary embodiments channel-selective RF power sensor 100, one or more of variable gain stage 411, in-phase mixer 412, local oscillator 413, in-phase gain stage 414, quadrature mixer 415, quadrature gain stage 416, in-phase low pass filter 421, in-phase ADC 422, quadrature low pass filter 423, quadrature ADC 424, in-phase bandpass filter module 431, delay module 432, summing module 433, quadrature bandpass filter module 434, phase shift module 435, and/or function module 436 can be implemented using discrete components.

Further, signal processing microcontroller 430 also receives the output from reset switch 445. Microcontroller 430 is also configured to restart when reset switch 445 is pressed, which may be used to "wake-up" microcontroller 430 should microcontroller 430 enter a sleep state. Microcontroller 430 is further configured to control the state of LED 450. In an exemplary embodiment, microcontroller 430 is configured to illuminate LED 450 when channel-selective RF power sensor 100 is provided with electrical power through port 442. In another exemplary embodiment, microcontroller 430 is configured to illuminate LED 450 to indicate special conditions of RF power sensor 100 such as, but not limited to, an alarm condition or communication error.

Figure 10:
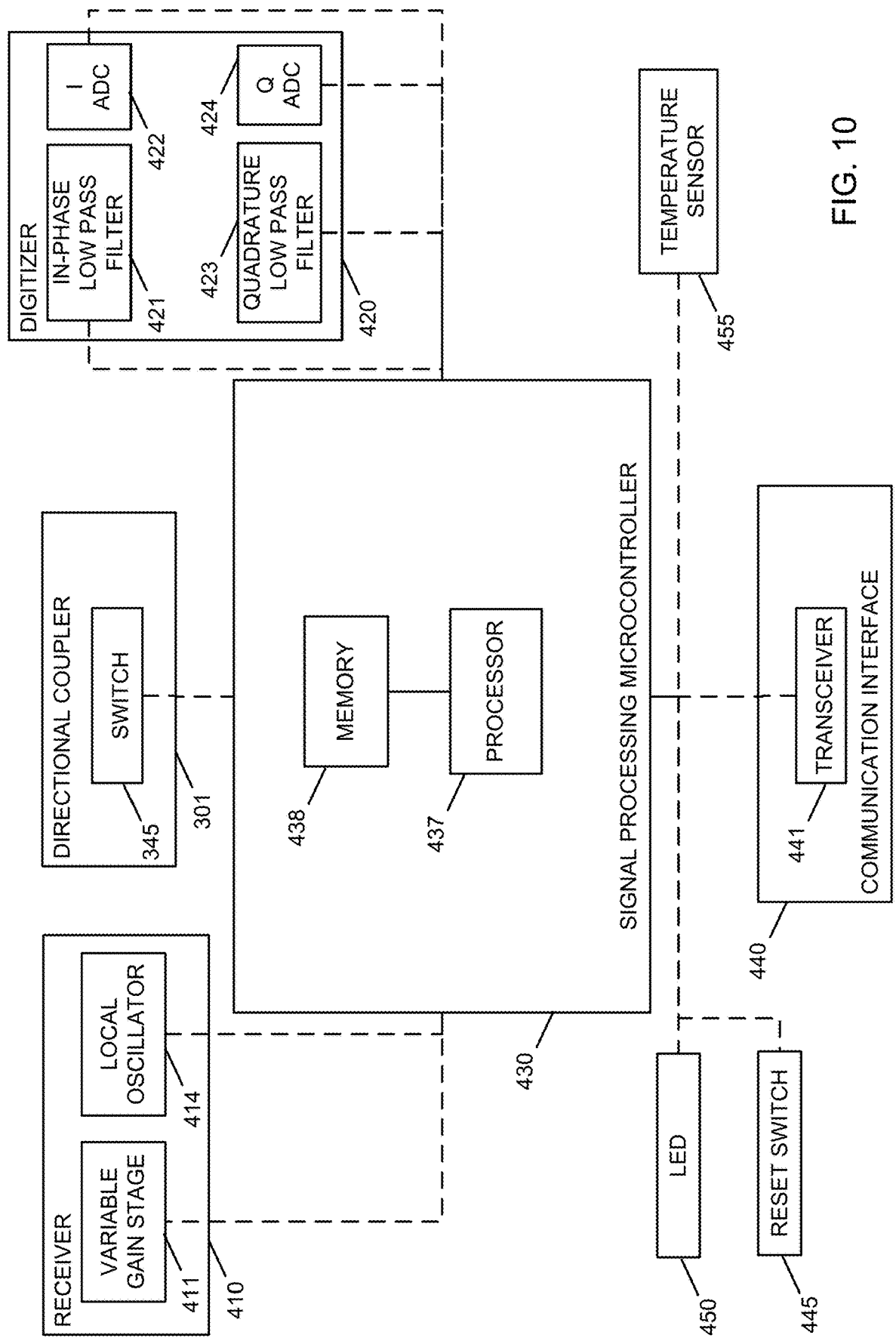
FIG. 10 is a block diagram of the signal paths of signal processing microcontroller of channel-selective RF power sensor in accordance with an exemplary embodiment of the invention.

FIG. 10 is a block diagram of signal processing microcontroller 430 of channel-selective RF power sensor 100 in accordance with an exemplary embodiment of the invention. Signal processing microcontroller 430 has a processor 437 and memory 438. As was stated above, since microcontroller 430 includes a processor 437 and memory 438, the term microcontroller 430 is intended to encompass embodiments of channel-selective RF power sensor 100 that are implemented using stand-alone processor 437 and memory 438, and also embodiments of channel-selective RF power sensor 100 that are implemented using a microcontroller 430 that has an integrated processor 437 and memory 438.

Signal processing microcontroller 430 is configured to retrieve from memory 438 and set the gain of variable gain stage 411 using processor 437. Further, the frequency of local oscillator 413 is retrieved from memory 438 and set by processor 437 of signal processing microcontroller 430. Also, the position of switch 345 is retrieved from memory 438 and set using processor 437 of signal processing microcontroller 430. Additionally, the coefficients for in-phase low pass filter 421 and quadrature low pass filter 423 are retrieved from memory 438 and set using processor 437 of signal processing microcontroller 430. Further, the analog to digital conversions performed by in-phase ADC 422 and quadrature ADC 424 are controlled by processor 437 of signal processing microcontroller 430. Also, the state of LED 450 is stored in memory 438 and set by processor 437 of signal processing microcontroller 430. Further, the state of reset switch 445 is monitored by processor 437 of signal processing microcontroller 430. Additionally, the values produced by temperature sensor 455 are retrieved by processor 437 and stored in memory 438 of signal processing microcontroller 430. Further, the operation of transceiver 441 is controlled by processor 437 of signal processing microcontroller 430. Additionally, and the information received by transceiver 441 is stored in memory 438 and RF energy information stored in memory 438 by processor 437 is then retrieved from memory 438 by processor 437 of signal processing microcontroller 430 and transmitted by transceiver 441.

Figure 11:
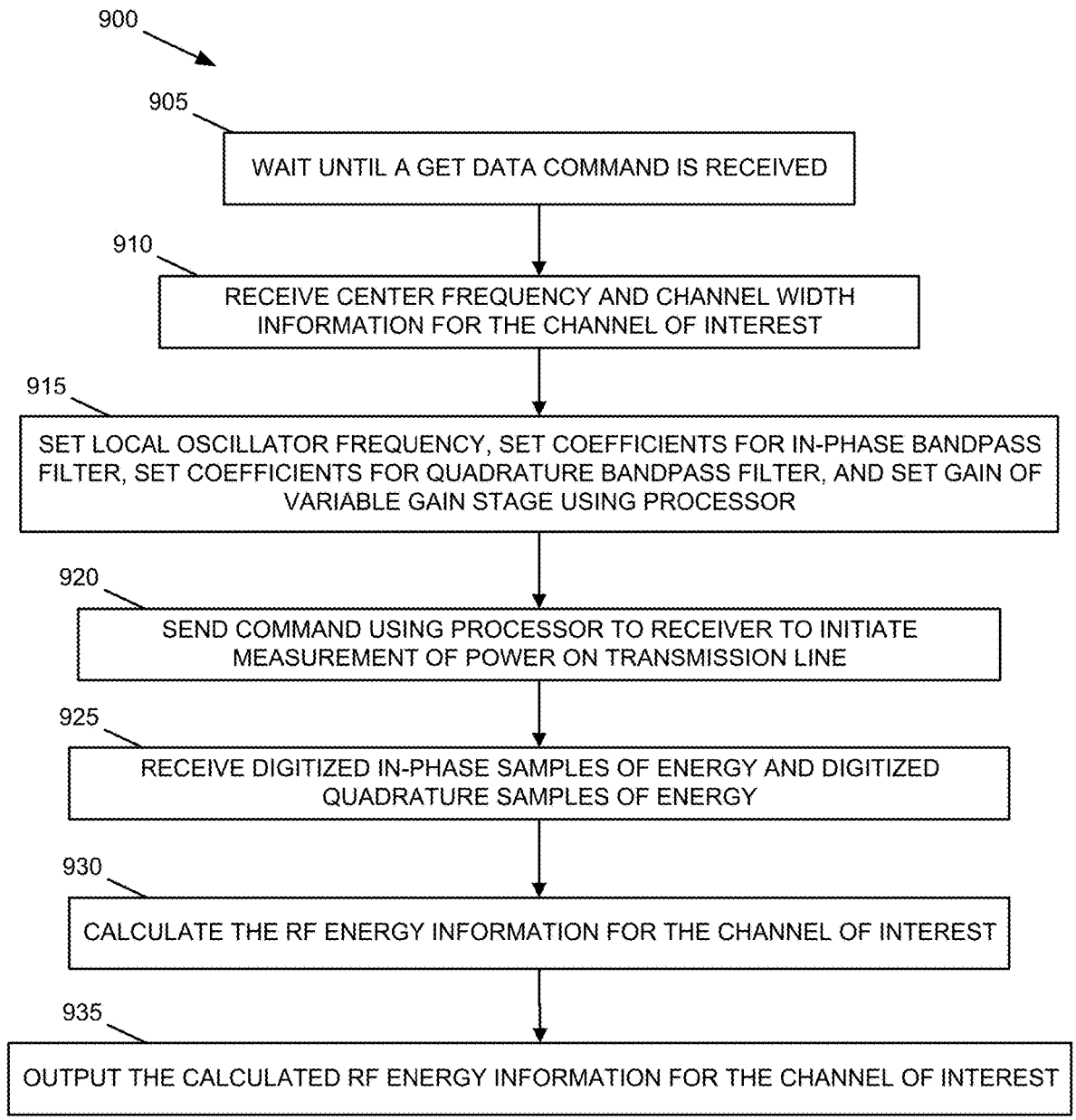
FIG. 11 is a flow chart of a program for operating the channel-selective RF power sensor stored in memory and executed by processor of channel-selective power meter in accordance with an exemplary embodiment of the invention.

FIG. 11 is a flow chart for program 900 stored in memory 438 and executed by the processor 437 of microcontroller 430 in channel-selective RF power sensor 100. The program 900 is directed to calculating and transmitting the RF energy information for the channel being measured of the power on main transmission line 600 using channel-selective RF power sensor 100 in accordance with an exemplary embodiment of the invention.

In block 905 processor 437 pauses until a get command is received. In an exemplary embodiment, the get command can be received from channel power meter 720.

In block 910, once the get command is received, processor 437 receives the center frequency and channel width information for the channel being measured and stores the received center frequency and channel width information in memory 438. The center frequency and channel width information for the channel being measured are user selectable. In an exemplary embodiment, the center frequency and channel width information selected by a user via and received from channel power meter 720.

In block 915, the frequency of local oscillator 413 is set equal to the center frequency stored in memory 438 by processor 437. However, in some exemplary embodiments, the frequency of local oscillator 413 can be offset from the center frequency stored in memory 438 by processor 437 to optimize image rejection performance of the circuit. Stated alternatively, in some embodiments, the frequency of local oscillator 413 can be offset from the center frequency stored in memory 438 by processor 437 to optimize image rejection performance of the channel-selective power measurement circuit 400. Accordingly, the local oscillator 413 is programmed based on the center frequency of the channel being measured. The coefficients for in-phase bandpass filter module 431 and coefficients for quadrature bandpass filter module 434 are set by processor 437 using a bandpass filter coefficients lookup table stored in memory 438 based upon the user selected channel width stored in memory 438. The gain of variable gain stage 411 is retrieved from memory 438 and set using processor 437. In an embodiment, the gain of variable gain stage 411 can be set using a gain lookup table stored in memory 438 based upon the value of the amplitude of the sample of energy received from coupler 300.

In block 920, processor 437 instructs the receiver 410 to initiate measurement of power on main transmission line 600 provided by coupler 300. The measurement of power on main transmission line 600 includes both forward and reflected power measurements in embodiments of channel-selective RF power sensor 100 having a directional coupler 301. Further, in embodiments of channel-selective RF power sensor 100 having a directional coupler 301, processor 437 sets switch 345 to the "forward" position to receive and pass forward power measurements to channel-selective power measurement circuit 400, and sets switch 345 to the "reflected" position to receive and pass reflected power measurements to channel-selective power measurement circuit 400.

In block 925, digitized in-phase samples of energy and digitized quadrature samples of energy are produced by in-phase ADC 422 and quadrature ADC 424 and provided to the in-phase bandpass filter module 431 and quadrature bandpass filter module 434 of processor 437. In-phase bandpass filter module 431 and quadrature bandpass filter module 434 only pass the signals that fall within the channel being measured, thereby providing filtered digitized in-phase samples of energy and filtered digitized quadrature samples of energy. Processor 738 applies a delay to the filtered digitized in-phase samples of energy using delay module 432 and a phase shift to the filtered digitized quadrature samples of energy using phase shift module 435, thereby producing delayed digitized in-phase samples of energy and shifted digitized quadrature samples of energy. Processor 738 sums the delayed digitized in-phase samples of energy and shifted digitized quadrature samples of energy using summing module 433, thereby producing summed samples of energy that are provided to the function module 436.

In block 930, function module 436 of processor 738 uses the summed samples of energy to produce RF energy information for the channel being measured on main transmission line 600. In some exemplary embodiments, function module 436 can also apply temperature correction using the temperature level output of temperature sensor 455 in conjunction with a temperature characterization curve stored in memory 438. Further, in some exemplary embodiments, function module 436 can also apply a calibration correction factor stored in memory 438 to the RF energy information. In exemplary embodiments of channel-selective RF power sensor 100 having a directional coupler 301, RF energy information includes information for both forward and reflected power for the channel being measured on main transmission line 600.

In block 935, the RF energy information calculated by function module 436 is outputted from channel-selective RF power sensor 100 by processor 738 using transceiver 441 of communication interface 440. In an exemplary embodiment, processor 738 can output the RF energy information from channel-selective RF power sensor 100 to channel power meter 720 using transceiver 441 of communication interface 440.

Figure 12A:
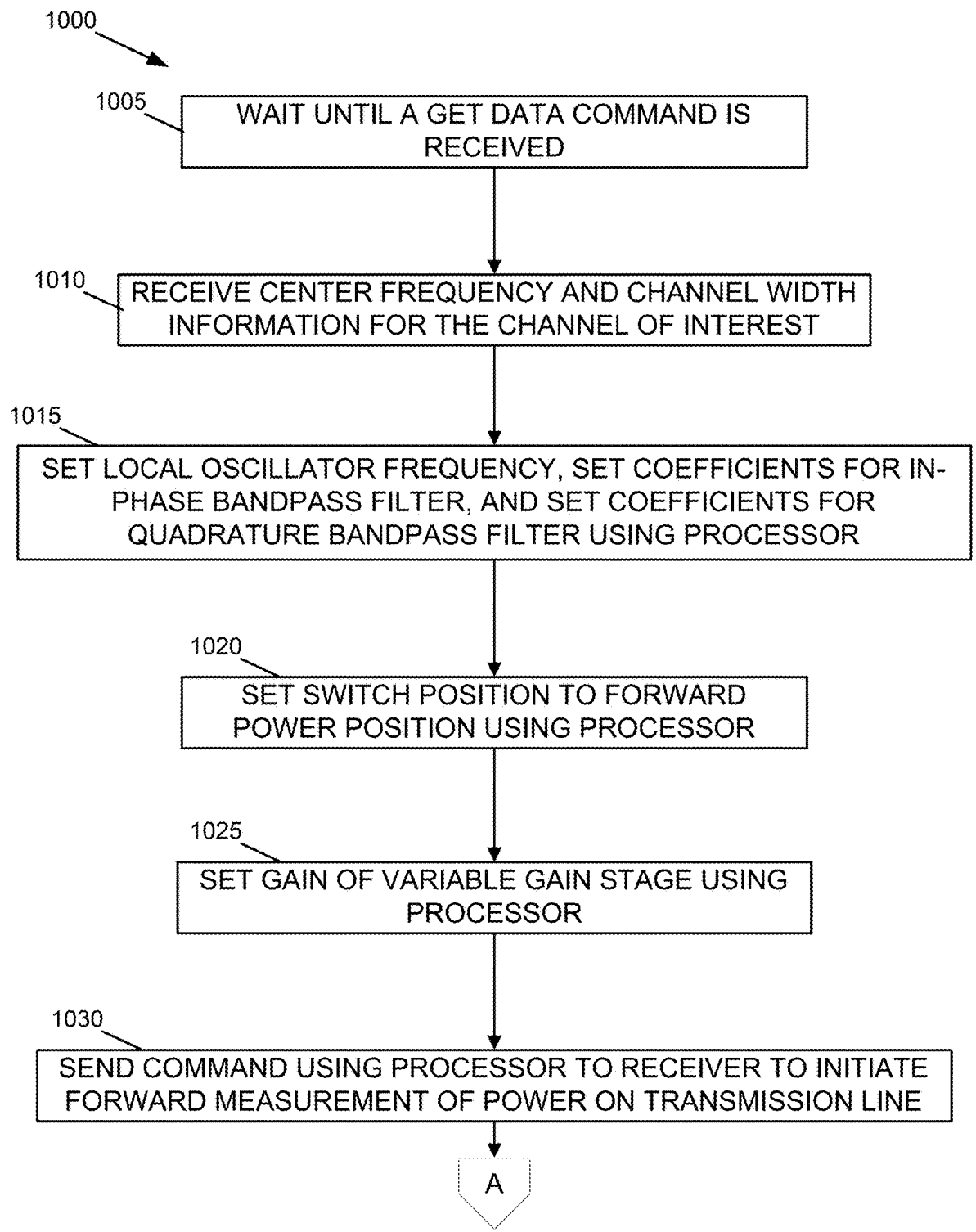
FIGS. 12A-B is a flow chart for program stored in memory and executed by the processor of channel-selective RF power sensor for calculating and transmitting the RF energy information for the channel being measured in accordance with an exemplary embodiment of the invention.
Figure 12B:
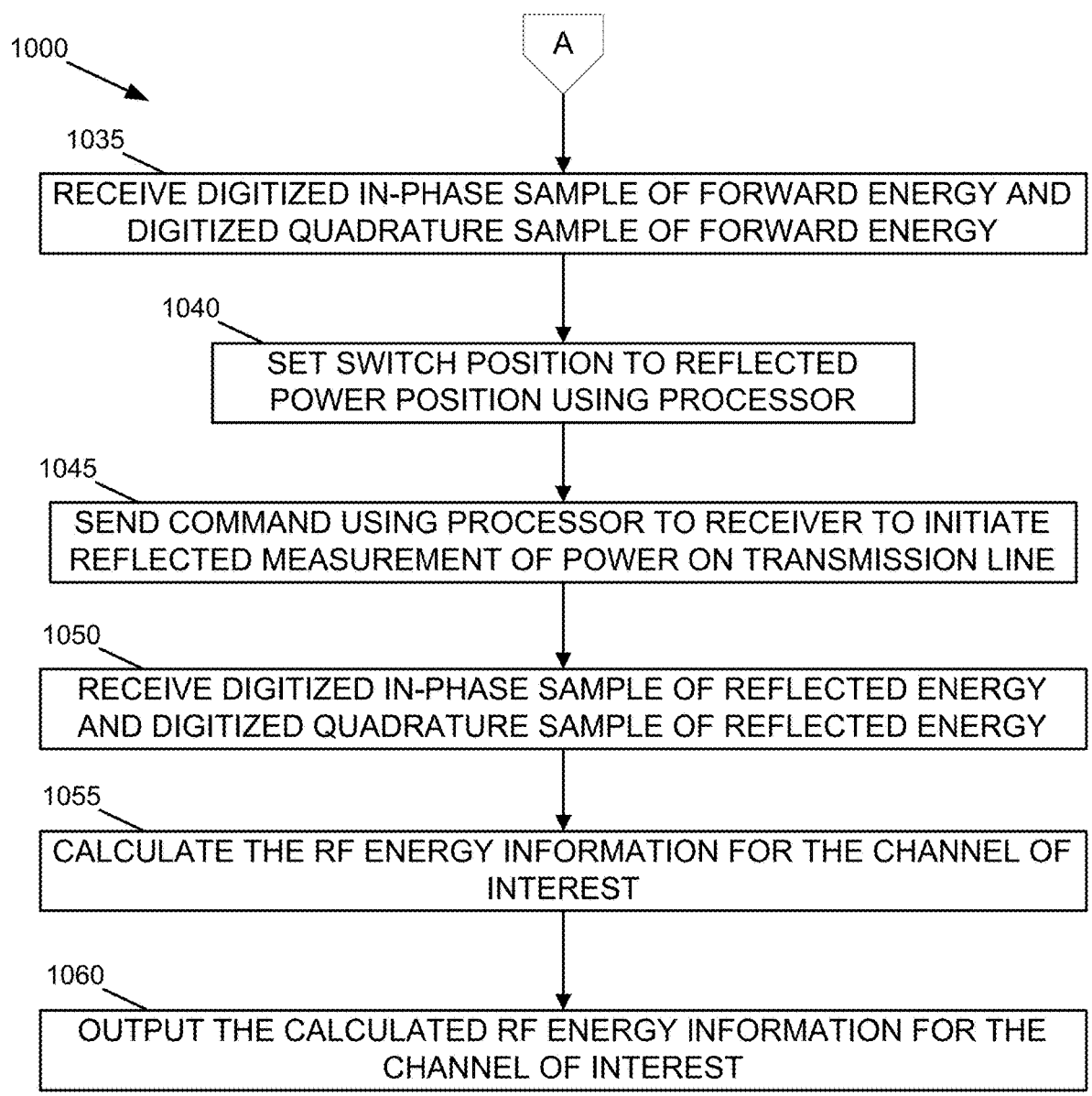

FIGS. 12A-B is a flow chart for program 1000 stored in memory 438 and executed by the processor 437 of microcontroller 430 in channel-selective RF power sensor 100. The program 1000 is directed to calculating and transmitting the RF energy information for the channel being measured of the power on main transmission line 600 using channel-selective RF power sensor 100 having a directional coupler 301 in accordance with an exemplary embodiment of the invention.

In block 1005, processor 437 pauses until a get command is received. In an exemplary embodiment, the get command can be received from channel power meter 720.

In block 1010, once the get command is received, processor 437 receives the center frequency and channel width information for the channel being measured and stores the received center frequency and channel width information in memory 438. The center frequency and channel width information for the channel being measured are user selectable. In an exemplary embodiment, the center frequency and channel width information selected by a user via and received from channel power meter 720.

In block 1015, the frequency of local oscillator 413 is set equal to the center frequency stored in memory 438 by processor 437. In some exemplary embodiments, the frequency of local oscillator 413 can be offset from the center frequency stored in memory by processor to optimize image rejection performance of the circuit. Stated alternatively, in some embodiments, the frequency of local oscillator 413 can be offset from the center frequency stored in memory 438 by processor 437 to optimize image rejection performance of the channel-selective power measurement circuit 400. Accordingly, the local oscillator 413 is programmed based on the center frequency of the channel being measured. The coefficients for in-phase bandpass filter module 431 and coefficients for quadrature bandpass filter module 434 are set by processor 437 using a bandpass filter coefficients lookup table stored in memory 438 based upon the user selected channel width stored in memory 438.

In block 1020, processor 437 sets switch 345 of directional coupler 301 to the "forward" position to receive and pass forward power measurements from directional coupler 301 to channel-selective power measurement circuit 400.

In block 1025, the gain of variable gain stage 411 is retrieved from memory 438 and set using processor 437. In an embodiment, the gain of variable gain stage 411 can be set using a gain lookup table stored in memory 438 based upon the value of the amplitude of the sample of energy received from coupler 300.

In block 1030, processor 437 instructs the receiver 410 to receive and initiate measurement of forward power on main transmission line 600 provided by directional coupler 301.

In block 1035, digitized in-phase samples of forward energy and digitized quadrature samples of forward energy are produced by in-phase ADC 422 and quadrature ADC 424 and provided to the in-phase bandpass filter module 431 and quadrature bandpass filter module 434 of processor 437. In-phase bandpass filter module 431 and quadrature bandpass filter module 434 only pass the signals that fall within the channel being measured, thereby providing filtered digitized in-phase samples of forward energy and filtered digitized quadrature samples of forward energy. Processor 738 applies a delay to the filtered digitized in-phase samples of forward energy using delay module 432 and a phase shift to the filtered digitized quadrature samples of forward energy using phase shift module 435, thereby producing delayed digitized in-phase samples of forward energy and shifted digitized quadrature samples of forward energy. Processor 738 sums the delayed digitized in-phase samples of forward energy and shifted digitized quadrature samples of forward energy using summing module 433, thereby producing summed samples of forward energy that are provided to the function module 436.

In block 1040, processor 437 sets switch 345 of directional coupler 301 to the "reflected" position to receive and pass forward power measurements from directional coupler 301 to channel-selective power measurement circuit 400.

In block 1045, processor 437 instructs the receiver 410 to receive and initiate measurement of reflected power on main transmission line 600 provided by directional coupler 301.

In block 1050, digitized in-phase samples of reflected energy and digitized quadrature samples of reflected energy are produced by in-phase ADC 422 and quadrature ADC 424 and provided to the in-phase bandpass filter module 431 and quadrature bandpass filter module 434 of processor 437. In-phase bandpass filter module 431 and quadrature bandpass filter module 434 only pass the signals that fall within the channel being measured, thereby providing filtered digitized in-phase samples of reflected energy and filtered digitized quadrature samples of reflected energy. Processor 738 applies a delay to the filtered digitized in-phase samples of reflected energy using delay module 432 and a phase shift to the filtered digitized quadrature samples of reflected energy using phase shift module 435, thereby producing delayed digitized in-phase samples of reflected energy and shifted digitized quadrature samples of reflected energy. Processor 738 sums the delayed digitized in-phase samples of reflected energy and shifted digitized quadrature samples of reflected energy using summing module 433, thereby producing summed samples of reflected energy that are provided to the function module 436.

In block 1055, function module 436 of processor 738 uses the summed samples of forward energy and summed samples of reflected energy to produce RF energy information for the channel being measured on main transmission line 600, including information for both forward and reflected power for the channel being measured on main transmission line 600. In some exemplary embodiments, function module 436 can also apply temperature correction using the temperature level output of temperature sensor 455 in conjunction with a temperature characterization curve stored in memory 438. Further, in some exemplary embodiments, function module 436 can also apply a calibration correction factor stored in memory 438 to the RF energy information.

In block 1060, the RF energy information calculated by function module 436 is outputted from channel-selective RF power sensor 100 by processor 738 using transceiver 441 of communication interface 440. In an exemplary embodiment, processor 738 can output the RF energy information from channel-selective RF power sensor 100 to channel power meter 720 using transceiver 441 of communication interface 440.

Figure 13A:
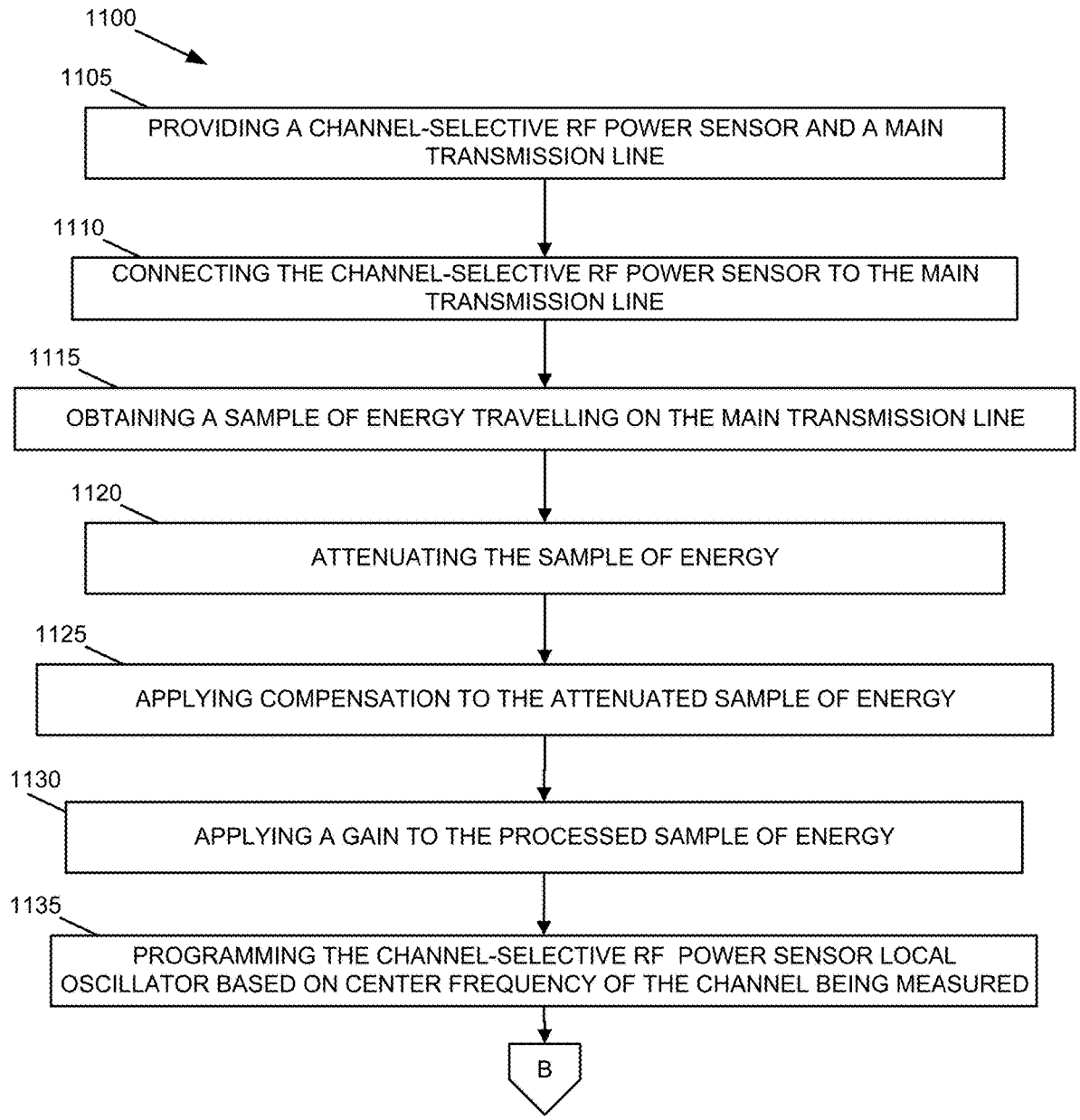
FIGS. 13A-C is a flow chart for program stored in memory and executed by the processor of channel-selective RF power sensor for calculating and transmitting the RF energy information for the channel being measured in accordance with an exemplary embodiment of the invention.
Figure 13B:
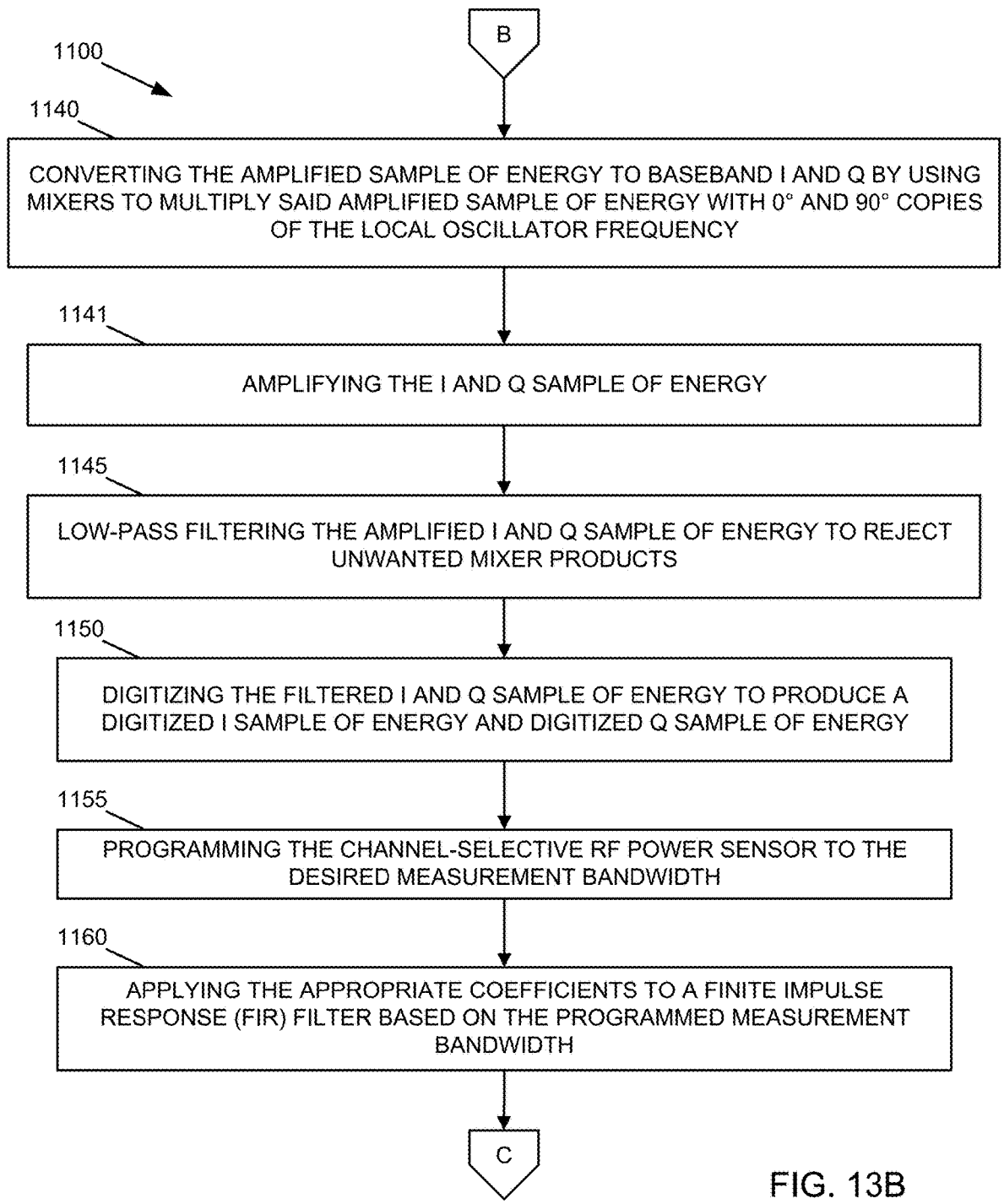
Figure 13C:
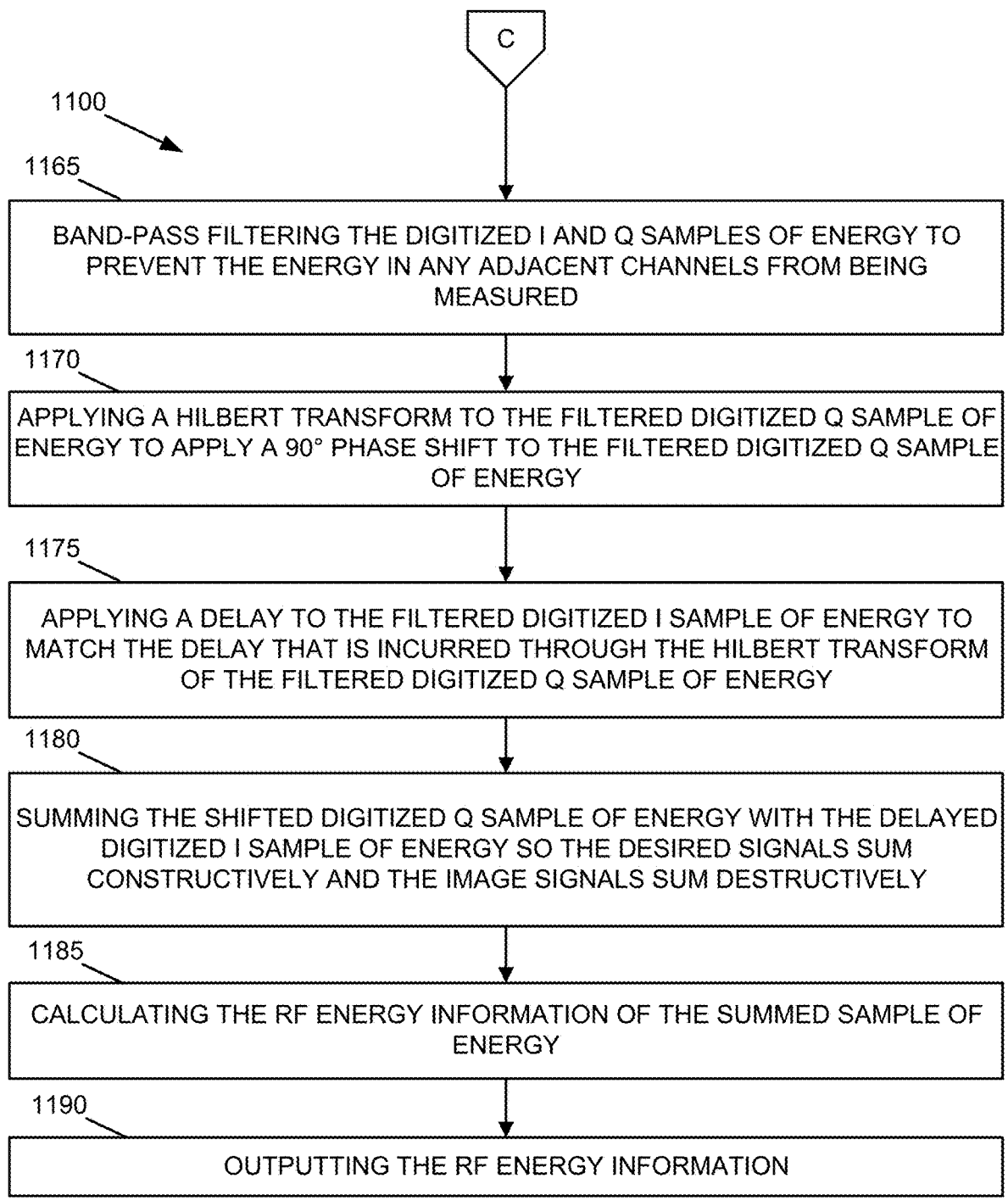

FIGS. 13A-C are flow charts of a method of using channel-selective RF power sensor 100 to measure power flowing on main transmission line 600 in accordance with an exemplary embodiment of the invention. More specifically, FIGS. 13A-C are flow charts of a method of using channel-selective RF power sensor 100 to measure channelized non-directional power flowing on main transmission line 600 in accordance with an exemplary embodiment of the invention.

In block 1105, channel-selective RF power sensor 100 and main transmission line 600 are provided. In block 1110, channel-selective RF power sensor 100 is connected to main transmission line 600.

In block 1115, a sample of energy is obtained by channel-selective RF power sensor 100 using non-directional coupler 302 from main transmission line 600. The sample of energy is non-directional. In block 1120, the sample of energy is attenuated. The sample of energy is attenuated using resistive attenuator 321.

In block 1125, compensation is applied to the sample of energy, thereby producing a processed sample of energy. Compensation is applied to the sample of energy using capacitor 331.

In block 1130, a gain is applied to the processed sample of energy by variable gain stage 411.

In block 1135, the local oscillator 413 is programmed to the center frequency of the channel being measured. However, in some exemplary embodiments, the frequency of local oscillator 413 can be offset from the center frequency of the channel being measured to optimize image rejection performance of the circuit. In one exemplary embodiment, the offset can be + or −50 kHz. Stated alternatively, in some embodiments, the frequency of local oscillator 413 can be offset from the center frequency of the channel being measured to optimize image rejection performance of the channel-selective power measurement circuit 400. In an exemplary embodiment, the center frequency value of the local oscillator is user specified, such as by using channel power meter 720, and set by processor 437. Accordingly, the local oscillator 413 is programmed based on the center frequency of the channel being measured.

In block 1140, the amplified sample of energy is converted to baseband in-phase and quadrature using in-phase mixer 412 and quadrature mixer 415 to multiply the amplified sample of energy with in-phase and quadrature copies of the frequency of local oscillator 413.

In block 1141, the in-phase sample of energy is amplified by in-phase gain stage 414 to a level sufficient for low pass filtering and the quadrature sample of energy is amplified by quadrature gain stage 416 to a level sufficient for low pass filtering.

In block 1145, the amplified in-phase sample of energy is low-pass filtered using in-phase low pass filter 421 and amplified quadrature sample of energy is low-pass filtered using quadrature low pass filter 423 in order to reject unwanted mixer products.

In block 1150, the filtered in-phase sample of energy is digitized using in-phase ADC 422 to produce a digitized in-phase sample of energy, and filtered quadrature sample of energy is digitized using quadrature ADC 424 to produce a digitized quadrature sample of energy.

In block 1155, the user selected bandwidth of the channel being measured is provided to channel-selective RF power sensor 100.

In block 1160 the coefficients of in-phase bandpass filter 431 and quadrature bandpass filter 434 are set to provide a bandwidth equivalent to the user selected bandwidth for the channel being measured.

In block 1165, the digitized in-phase sample of energy is bandpass filters using the in-phase bandpass filter 431 and the quadrature sample of energy is bandpass filtered using the quadrature bandpass filter 434, thereby preventing the energy in any adjacent channels from being measured.

In block 1170, a phase shift is applied to the filtered digitized quadrature sample of energy using phase shift module 435. In an exemplary embodiment, phase shift module uses a Hilbert transform to apply a 90 degree phase shift to the filtered digitized quadrature sample of energy.

In block 1175, a delay is applied to the filtered digitized in-phase sample of energy using delay module 432 to match the delay that is incurred through the application of the phase shift to the filtered digitized quadrature sample of energy.

In block 1180, the shifted digitized quadrature sample of energy is summed with the delayed digitized in-phase sample of energy using summing module 433 so the desired signals sum constructively and the image signals sum destructively.

In block 1185, the RF energy information for the summed sample of energy is calculated using function module 436. In some exemplary embodiments, function module 436 can also apply a temperature correction and/or a calibration correction factor to the RF energy information.

In block 1190, the RF energy information is outputted for the sample of energy using transceiver 441 of communication interface 440. In an exemplary embodiment, the forward channel power is outputted when the sample of energy is forward energy, and the reflected channel power is outputted when the same of energy is reflected energy. In an exemplary embodiment, the RF energy information can be outputted to channel power meter 720 for display to the user and the performance of additional calculations by channel power meter 720, including, but not limited to, channel-to-channel measurements and comparisons.

Figure 14A:
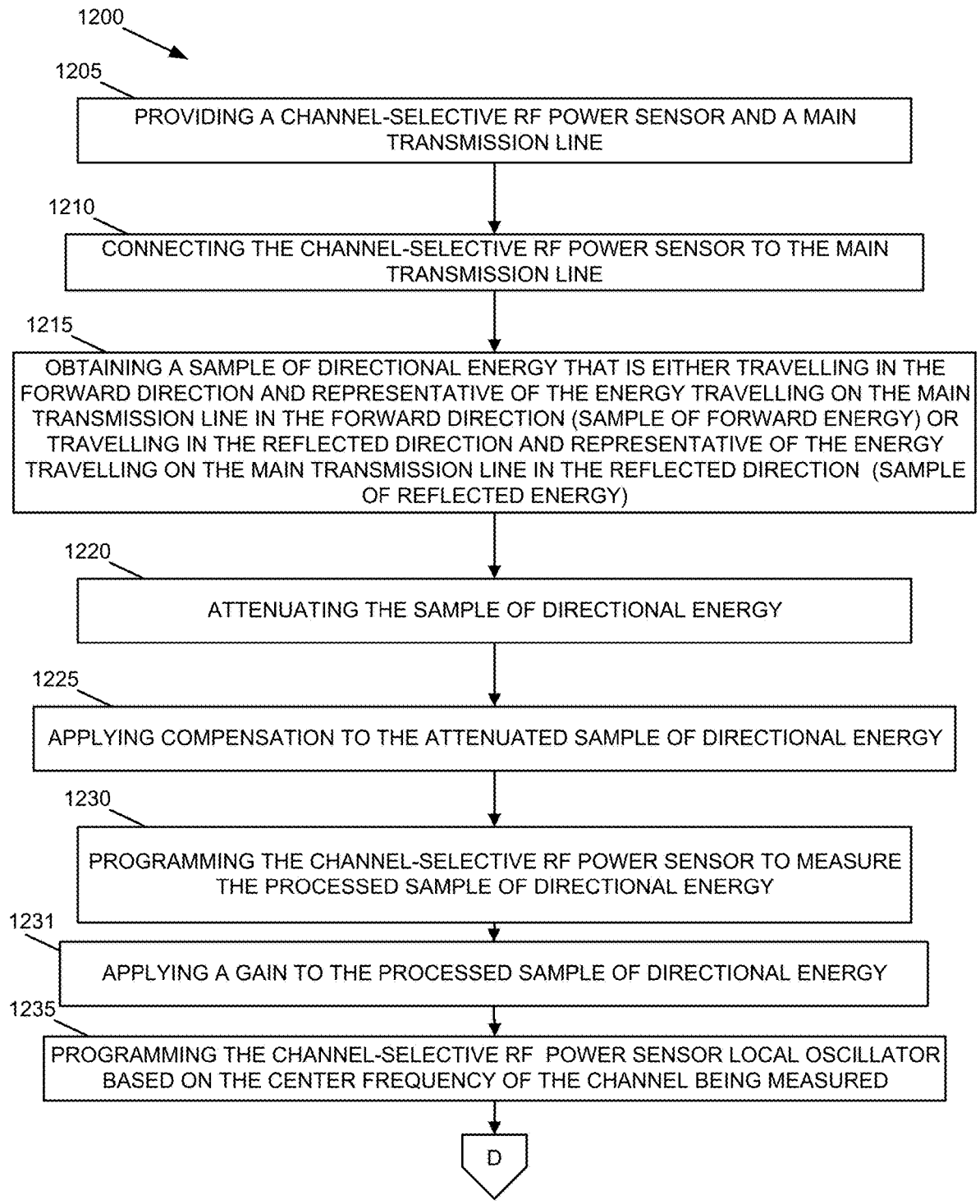
FIGS. 14A-C is a flow chart for program stored in memory and executed by the processor of channel-selective RF power sensor for calculating and transmitting the RF energy information for the channel being measured in accordance with an exemplary embodiment of the invention.
Figure 14B:
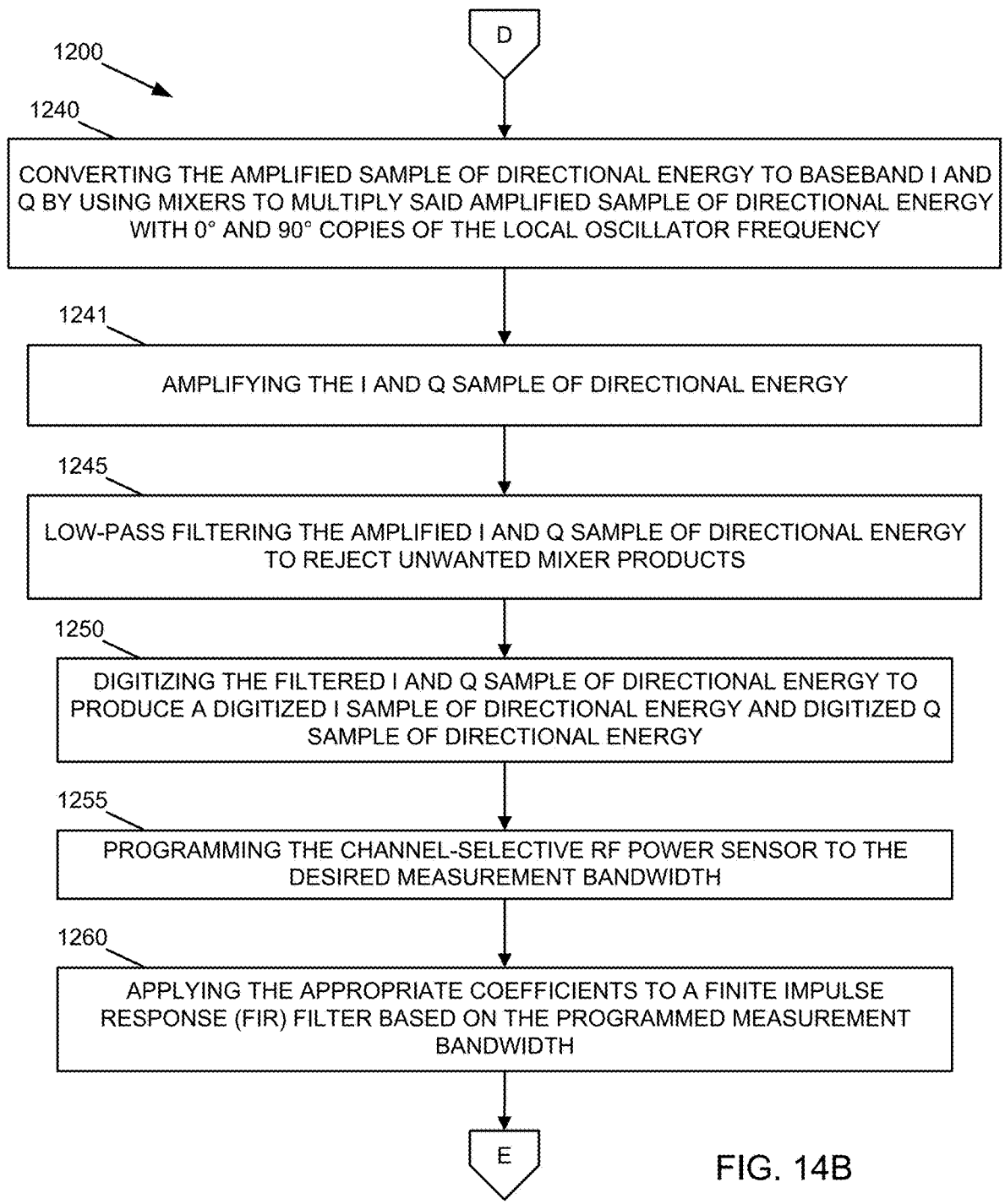
Figure 14C:
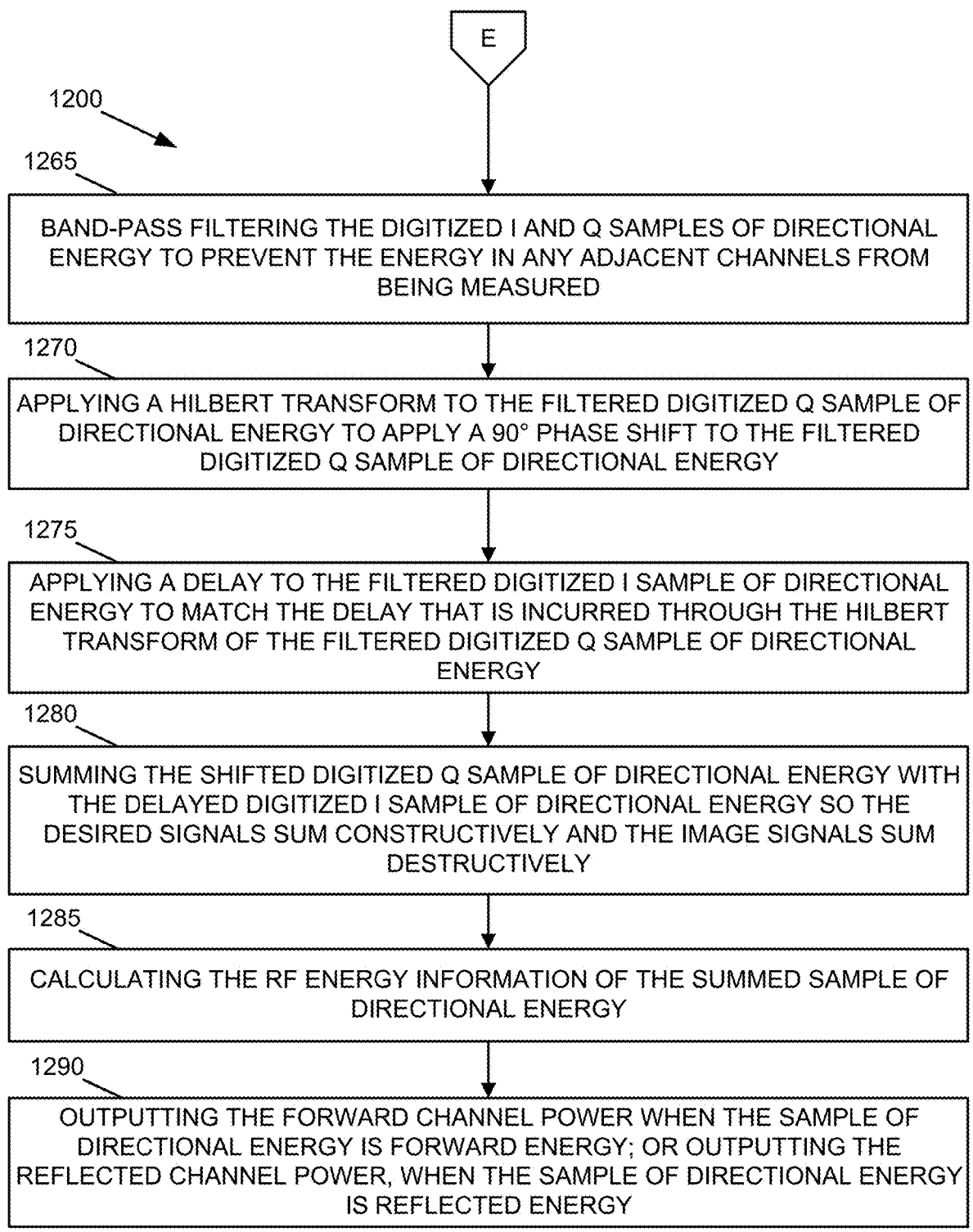

FIGS. 14A-C is a flow chart of a method of using channel-selective RF power sensor 100 to measure power flowing in a direction on main transmission line 600 in accordance with an exemplary embodiment of the invention. More specifically, FIGS. 14A-C are flow charts of a method of using channel-selective RF power sensor 100 to measure power flowing in a forward direction or a reflected direction on main transmission line 600 in accordance with an exemplary embodiment of the invention.

In block 1205, channel-selective RF power sensor 100 and main transmission line 600 are provided. In block 1210, channel-selective RF power sensor 100 is connected to main transmission line 600.

In block 1215, a sample of directional energy is obtained by channel-selective RF power sensor 100 using directional coupler 301 from main transmission line 600. The sample of directional energy can be travelling in either the forward direction or reflected direction. If travelling in the forward direction, the sample of directional energy is representative of the energy travelling on main transmission line 600 in the forward direction (sample of forward energy). If travelling in the reflected direction, the sample of directional energy is representative of the energy travelling on main transmission line 600 in the reflected direction (sample of reflected energy).

In block 1220, the sample of directional energy is attenuated. The sample of directional energy is attenuated using forward resistive attenuator 320, when the sample of directional energy is a sample of forward energy. The sample of directional energy is attenuated using reflected resistive attenuator 325, when the sample of directional energy is a sample of reflected energy.

In block 1225, compensation is applied to the sample of directional energy, thereby producing a processed sample of directional energy. Compensation is applied to the sample of directional energy using forward capacitor 330, when the sample of directional energy is a sample of forward energy. Compensation is applied to the sample of directional energy using reflected capacitor 335, when the sample of directional energy is a sample of reflected energy.

In block 1230, the channel selective RF power sensor is programmed to measure the processed sample of directional energy by placing switch 345 in a forward position/state, when the processed sample of directional energy is a sample of forward energy, or placing switch 345 in a reflected position/state, when the processed sample of directional energy is a sample of reflected energy.

In block 1231, a gain is applied to the processed sample of directional energy by variable gain stage 411.

In block 1235, the local oscillator 413 is programmed to the center frequency of the channel being measured. However, in some exemplary embodiments, the frequency of local oscillator 413 can be offset from the center frequency of the channel being measured to optimize image rejection performance of the circuit. In one exemplary embodiment, the offset can be + or −50 kHz. Stated alternatively, in some embodiments, the frequency of local oscillator 413 can be offset from the center frequency of the channel being measured to optimize image rejection performance of the channel-selective power measurement circuit 400. Accordingly, the local oscillator 413 is programmed based on the center frequency of the channel being measured. In an exemplary embodiment, the center frequency value of the local oscillator is user specified, such as by using channel power meter 720, and set by processor 437.

In block 1240, the amplified sample of directional energy is converted to baseband in-phase and quadrature using in-phase mixer 412 and quadrature mixer 415 to multiply the amplified sample of directional energy with in-phase and quadrature copies of the frequency of local oscillator 413.

In block 1241, the in-phase sample of directional energy is amplified by in-phase gain stage 414 to a level sufficient for low pass filtering and the quadrature sample of directional energy is amplified by quadrature gain stage 416 to a level sufficient for low pass filtering.

In block 1245, the amplified in-phase sample of directional energy is low-pass filtered using in-phase low pass filter 421 and amplified quadrature sample of directional energy is low-pass filtered using quadrature low pass filter 423 in order to reject unwanted mixer products.

In block 1250, the filtered in-phase sample of directional energy is digitized using in-phase ADC 422 to produce a digitized in-phase sample of directional energy, and filtered quadrature sample of directional energy is digitized using quadrature ADC 424 to produce a digitized quadrature sample of directional energy.

In block 1255, the user selected bandwidth of the channel being measured is provided to channel-selective RF power sensor 100.

In block 1260 the coefficients of in-phase bandpass filter 431 and quadrature bandpass filter 434 are set to provide a bandwidth equivalent to the user selected bandwidth for the channel being measured.

In block 1265, the digitized in-phase sample of directional energy is bandpass filters using the in-phase bandpass filter 431 and the quadrature sample of directional energy is bandpass filtered using the quadrature bandpass filter 434, thereby preventing the energy in any adjacent channels from being measured.

In block 1270, a phase shift is applied to the filtered digitized quadrature sample of directional energy using phase shift module 435. In an exemplary embodiment, phase shift module uses a Hilbert transform to apply a 90 degree phase shift to the filtered digitized quadrature sample of directional energy.

In block 1275, a delay is applied to the filtered digitized in-phase sample of directional energy using delay module 432 to match the delay that is incurred through the application of the phase shift to the filtered digitized quadrature sample of directional energy.

In block 1280, the shifted digitized quadrature sample of directional energy is summed with the delayed digitized in-phase sample of directional energy using summing module 433 so the desired signals sum constructively and the image signals sum destructively.

In block 1285, the RF energy information for the summed sample of directional energy is calculated using function module 436. In some exemplary embodiments, function module 436 can also apply a temperature correction and/or a calibration correction factor to the RF energy information.

In block 1290, the RF energy information is outputted for the sample of directional energy using transceiver 441 of communication interface 440. In an exemplary embodiment, the forward channel power is outputted when the sample of directional energy is forward energy, and the reflected channel power is outputted when the same of directional energy is reflected energy. In an exemplary embodiment, the RF energy information can be outputted to channel power meter 720 for display to the user and the performance of additional calculations by channel power meter 720, including, but not limited to, channel-to-channel measurements and comparisons.

Figure 15:
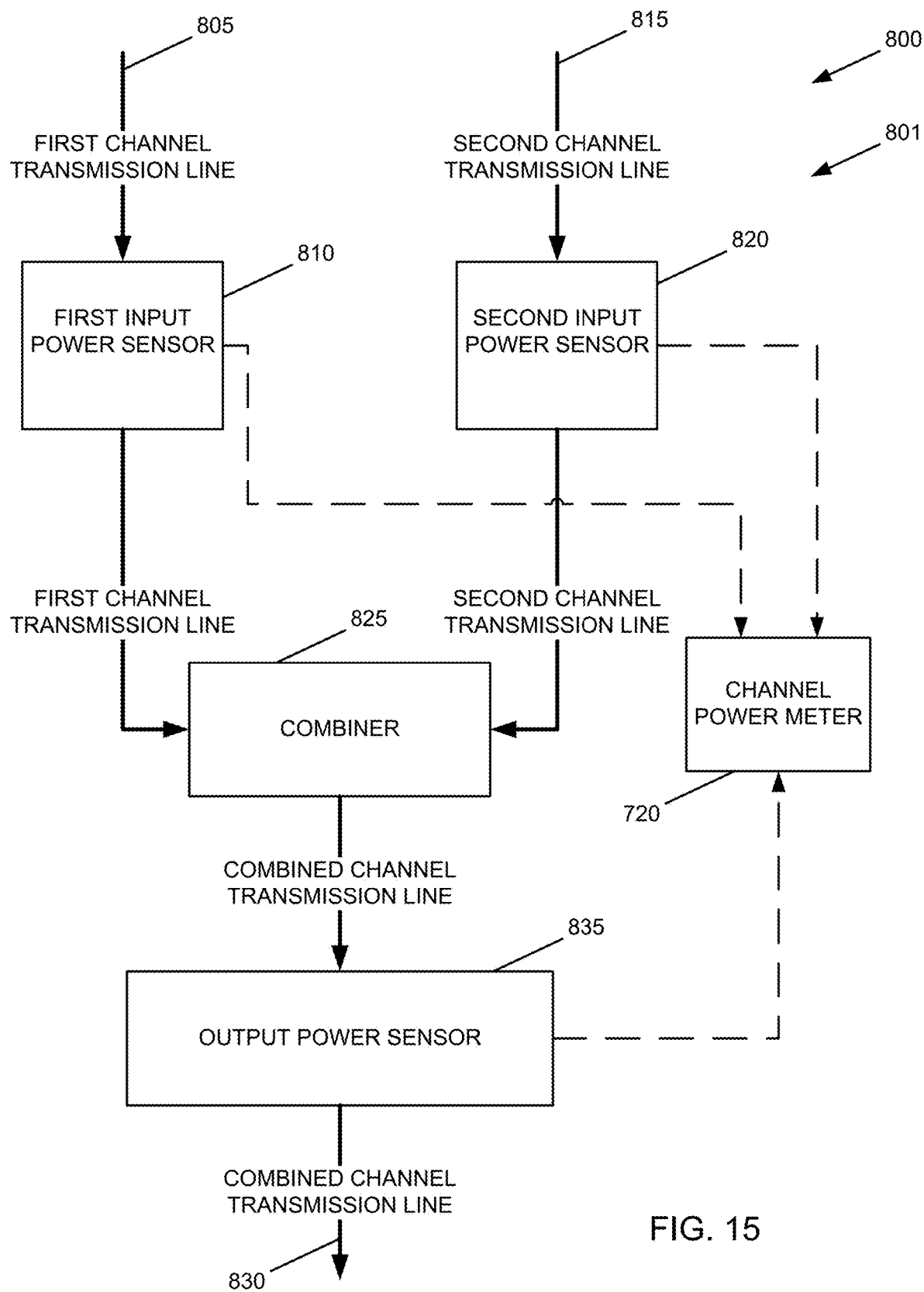
FIG. 15 is a block diagram of an RF power metering system with the channel-selective RF power sensor for a combiner system in accordance with an exemplary embodiment of the invention.

FIG. 15 is a block diagram of an RF power metering system 800 for an RF transmission system 801 having a combiner 825. RF power metering system 800 has a first input power sensor 810, second input power sensor 820, and output power sensor 835. RF transmission system 801 has a first channel transmission line 805, second channel transmission line 815, combiner 825, and combined channel transmission line 830.

First input power sensor 810 is electrically connectable to first channel transmission line 805 and channel power meter 720. Second input power sensor 820 is electrically connectable to second channel transmission line 815 and channel power meter 720. Combiner 825 is electrically connected to first channel transmission line 805, second channel transmission line 815, and combined channel transmission line 830. Output power sensor 835 is electrically connectable to combined channel transmission line 830 and channel power meter 720.

First input power sensor 810 is configured to measure the RF power level on the first channel transmission line 805 and provide the measured RF power level on the first channel transmission line 805 to channel power meter 720. Second input power sensor 820 is configured to measure the RF power level on the second channel transmission line 815 and provide the measured RF power level on the second channel transmission line 815 to channel power meter 720. First input power sensor 810 can be a directional or non-directional power sensor, such as channel-selective RF power sensor 100. Second input power sensor 820 can be a directional or non-directional power sensor, such as channel-selective RF power sensor 100.

Combiner 825 is configured to combine the first channel from first channel transmission line 805 and the second channel from second channel transmission line 815 onto combined channel transmission line 830. Output power sensor 835 is configured to measure the RF power level for the first channel on the combined channel transmission line 830 and provide the measured RF power level for the first channel to channel power meter 720. Output power sensor 835 is further configured to measure the forward RF power level and reflected RF power level for the first channel on the combined channel transmission line 830 and provide the forward RF power level and reflected RF power level for the first channel to channel power meter 720. Output power sensor 835 is also configured to measure the RF power level for the second channel on the combined channel transmission line 830 and provide the measured RF power level for the second channel to channel power meter 720. Output power sensor 835 is further configured to measure the forward RF power level and reflected RF power level for the second channel on the combined channel transmission line 830 and provide the forward RF power level and reflected RF power level for the second channel to channel power meter 720.

Output power sensor 835 can be any device that is capable of determining directional channelized power, such as channel-selective RF power sensor 100.

Channel power meter 720 is configured to display the RF power level for the first channel on the first channel transmission line 805, which is the RF power level for the first channel pre-combiner (RF power level for the first channel before entering combiner 825). Channel power meter 720 is also configured to display the RF power level for the second channel on the second channel transmission line 815, which is the RF power level for the second channel pre-combiner (RF power level for the second channel before entering combiner 825). Additionally, channel power meter 720 is configured to display the RF power level for the first channel on the combined channel transmission line 830, which is the RF power level for the first channel post-combiner (RF power level for the first channel after exiting combiner 825). Further, channel power meter 720 is configured to display the RF power level for the second channel on the combined channel transmission line 830, which is the RF power level for the second channel post-combiner (RF power level for the second channel after exiting combiner 825). Further, channel power meter 720 is configured to display the composite RF power level, which is the RF power level for all of the channels post-combiner on the combined channel transmission line 830 (RF power level for all of the channels after exiting combiner 825).

Additionally, channel power meter 720 is configured to display the forward RF power level for the first channel on the combined channel transmission line 830, which is the RF power level for the first channel in the forward direction post-combiner (forward RF power level for the first channel after exiting combiner 825). Also, channel power meter 720 is configured to display the reflected RF power level for the first channel on the combined channel transmission line 830, which is the RF power level for the first channel in the reflected direction post-combiner (reflected RF power level for the first channel after exiting combiner 825). Further, channel power meter 720 is configured to display the forward RF power level for the second channel on the combined channel transmission line 830, which is the forward RF power level for the second channel post-combiner (forward RF power level for the second channel after exiting combiner 825). Further, channel power meter 720 is configured to display the reflected RF power level for the second channel on the combined channel transmission line 830, which is the reflected RF power level for the second channel post-combiner (forward RF power level for the second channel after exiting combiner 825). Further, channel power meter 720 is configured to display the composite RF power level, which is the RF power level for all of the channels post-combiner on the combined channel transmission line 830 (RF power level for all of the channels after exiting combiner 825).

Also, channel power meter 720 is configured to calculate and display the combiner loss for the first channel, which is the difference between the RF power level for the first channel pre-combiner and the RF power level for the first channel post-combiner. Further, channel power meter 720 is configured to calculate and display the combiner loss for the second channel, which is the difference between the RF power level for the second channel pre-combiner and the RF power level for the second channel post-combiner. Additionally, channel power meter 720 is configured to calculate and display the voltage standing wave ratio (VSWR) on combined channel transmission line 830.

Figure 16:
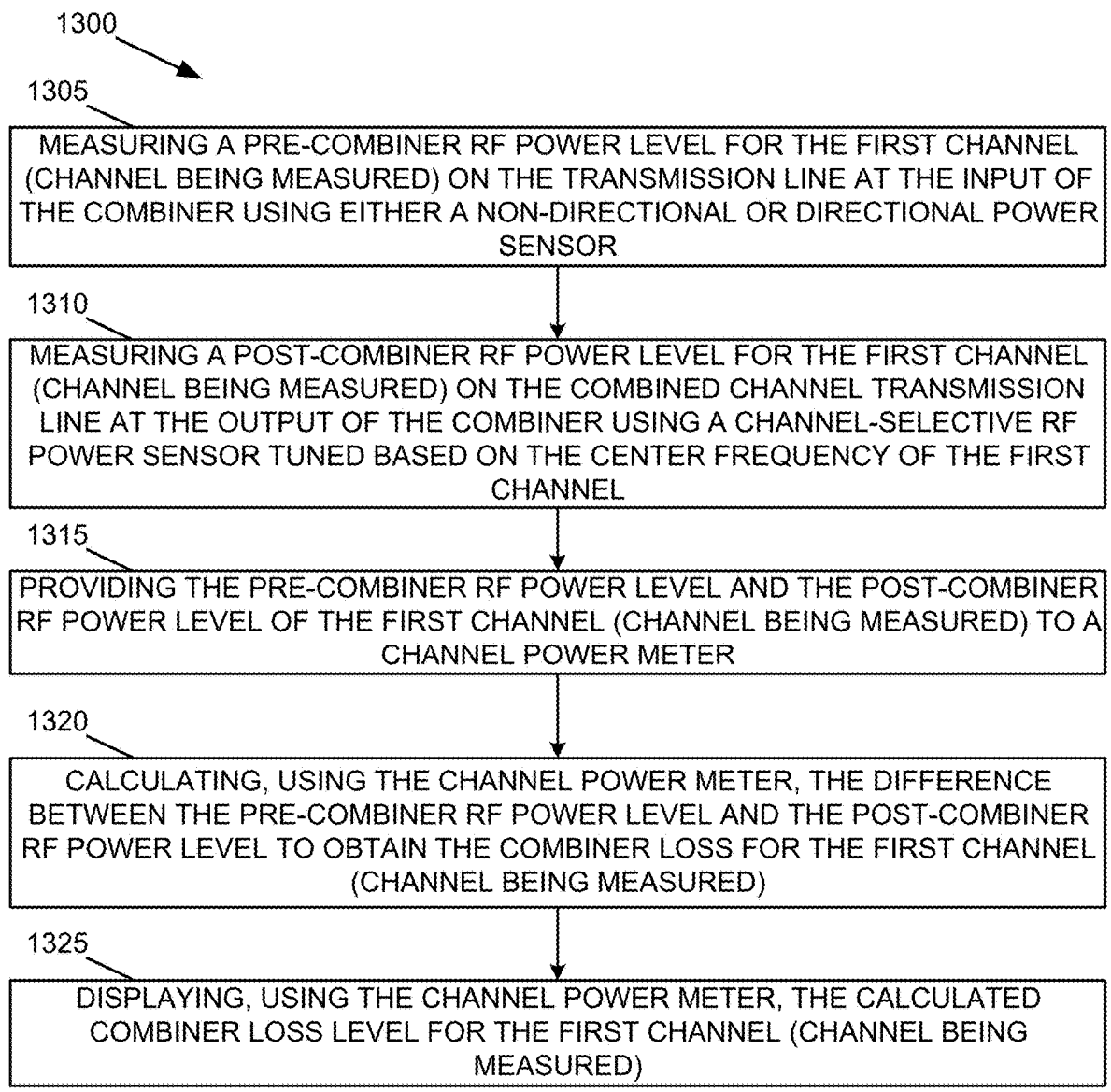
FIG. 16 is a flow chart showing a method for determining combiner loss in the RF transmission system using RF power metering system with channel-selective RF power sensor in accordance with an exemplary embodiment of the invention.

FIG. 16 is a flow chart showing a method 1300 for determining combiner loss in the RF transmission system 801 using RF power metering system 800 with channel-selective RF power sensor 100. In block 1305, a pre-combiner RF power level for the first channel on the first channel transmission line is measured using first input power sensor 810 at the input of combiner 825. In block 1310, a post-combiner RF power level for the first channel on combined channel transmission line 830 is measured using output power sensor 835 at the output of combiner 825. In an exemplary embodiment, the post combiner RF power level for the first channel is the forward RF power level for the first channel travelling in a forward direction on combined channel transmission line 830. In an exemplary embodiment, output power sensor 835 can be channel-selective RF power sensor 100 tuned based on the center frequency of the first channel.

In block 1315, the measured pre-combiner RF power level for the first channel is provided by first input power sensor 810 to channel power meter 720 and the measured post-combiner RF power level for the first channel is provided by output power sensor 835 (channel-selective RF power sensor 100) to channel power meter 720.

In block 1320, the combiner loss level for the first channel is calculated using channel power meter 720, by calculating the difference between the pre-combiner RF power level for the first channel and the post-combiner RF power level for the first channel (the channel being measured).

Figure 17:
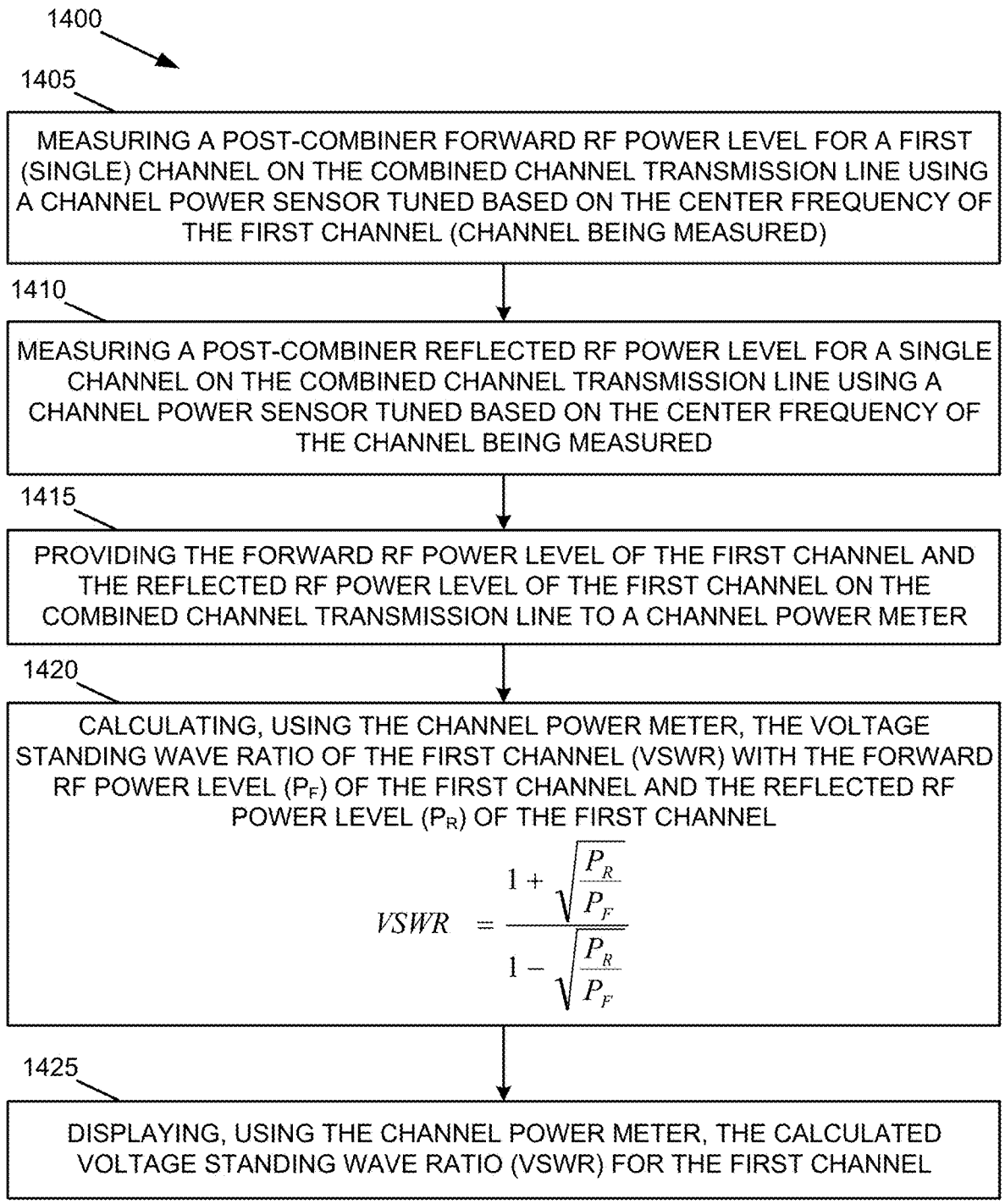
FIG. 17 is a flow chart showing a method for calculating VSWR in the RF transmission system using RF power metering system with RF power sensor in accordance with an exemplary embodiment of the invention.

FIG. 17 is a flow chart showing a method 1400 for determining the voltage standing wave ratio (VSWR) on the combined channel transmission line 830 of RF transmission system 801 using RF power metering system 800. In block 1405, a post-combiner forward RF power level for the first channel on the combined channel transmission line 830 is measured using the output power sensor 835.

In block 1410, a post-combiner reflected RF power level for the first channel (channel being measured) on the combined channel transmission line 830 is measured using output power sensor 835. In an exemplary embodiment, output power sensor 835 can be channel-selective RF power sensor 100 having directional coupler 301 and being tuned based on the center frequency of the first channel (channel being measured).

In block 1415, the measured forward RF power level for the first channel and the measured reflected RF power level for the first channel on the combined channel transmission line 830 are provided by output power sensor 835 to a channel power meter 720.

In block 1420, the VSWR is calculated, using the channel power meter 720, according to the following equation 1:

$$VSWR = \frac{1+\sqrt{\frac{P_R}{P_F}}}{1-\sqrt{\frac{P_R}{P_F}}} \quad \text{(equation 1)}$$

where, VSWR is the Voltage Standing Wave Ratio, $P_F$ is the forward RF power level, and $P_R$ is the reflected RF power level.

In block 1425, the calculated VSWR level on the combined channel transmission line 830 is displayed to a user by channel power meter 720. In an exemplary embodiment, channel power meter 720 displays the calculated VSWR level using display 724 of user I/O 726. In another exemplary embodiment, channel power meter 720 displays the calculated VSWR on an internet enabled device 728 using webserver 729.

Figure 18:
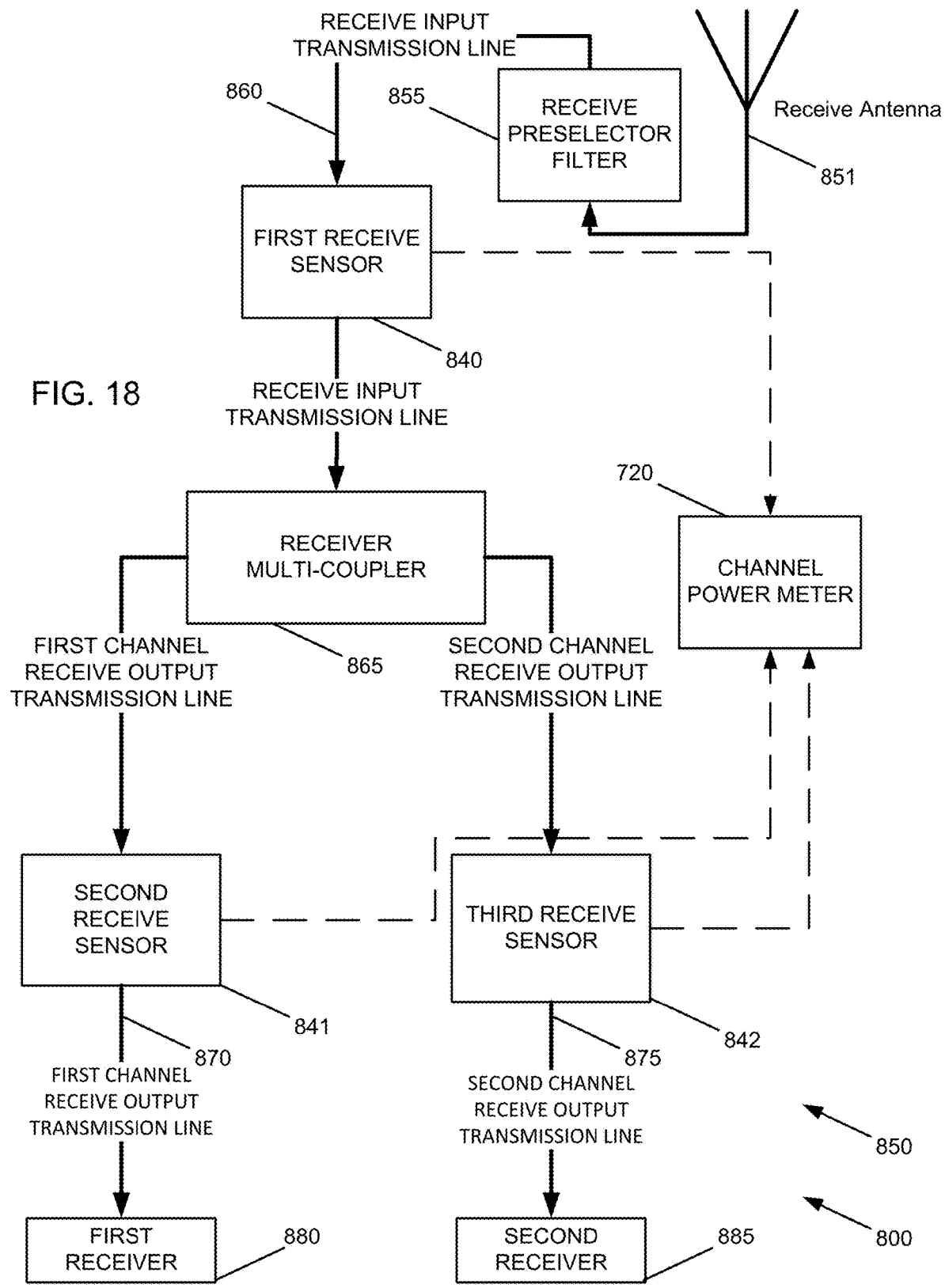
FIG. 18 is a block diagram of an RF power metering system with the channel-selective RF power sensor for a receiver multi-coupler system in accordance with an exemplary embodiment of the invention.

FIG. 18 shows a block diagram of an RF power metering system 800 for an RF receive system 850. RF power metering system 800 has channel power meter 720, first receive sensor 840, second receive sensor 841, and third receive sensor 842. First receive sensor 840, second receive sensor 841, and third receive sensor 842 are each electrically connected to and communicate with channel power meter 720.

RF receive system has a receive antenna 851 electrically connected to receive preselector filter 855 through receive input transmission line 860. Receive preselector filter 855 is electrically connected to receiver multi-coupler 865 through receive input transmission line 860. Receiver multi-coupler 865 is electrically connected first receiver 880 through first channel receive output transmission line 870. Receiver multi-coupler 865 is electrically connected to second receiver 885 through second channel receive output transmission line 875. First receive sensor 840 is electrically connectable to the receive input transmission line 860 and can be located between the receive preselector filter and the receiver multi-coupler 865. Second receive sensor 841 is electrically connectable to the first channel receive output transmission line 870 and can be placed between receiver multi-coupler 865 and first receiver 880. Third receive sensor 842 is electrically connectable to the second channel receive output transmission line 875 and can be placed between receiver multi-coupler 865 and second receiver 885.

Receive antenna 851 receives a composite signal containing multiple channels. The composite signal is initially filtered by receive preselector filter 855 to remove any unwanted frequencies and provided to receiver multi-coupler 865, which separates the composite signal into individual channels. Receiver multi-coupler 865 sends the first channel to first receiver 880 using first channel receive output transmission line 870, and receiver multi-coupler 865 sends the second channel to second receiver 885 using second channel receive output transmission line.

First receive sensor 840 is configured to measure the RF power level on the receive input transmission line 860, second receive sensor 841 is configured to measure the RF power level on the first channel receive output transmission line 870, and third receive sensor 842 is configured to measure the RF power level on the second channel receive output transmission line 875.

First receive sensor 840, second receive sensor 841, and third receive sensor 842 can be any directional or non-directional device that is capable of determining channelized power, such as channel-selective RF power sensor 100.

When non-directional sensors are used for first receive sensor 840 should be located as close as possible to the output of receive preselector filter 855. Further, second receive sensor 841 and third receive sensor 842 should be located as close as possible to receiver multi-coupler 865 output.

In some embodiments, channel power meter 720 is configured to calculate and display the combiner loss for the individual channels of receiver multi-coupler 865. Further, in some embodiments, channel power meter 720 is configured to calculate and display the antenna performance at each individual channel.

Figure 19:
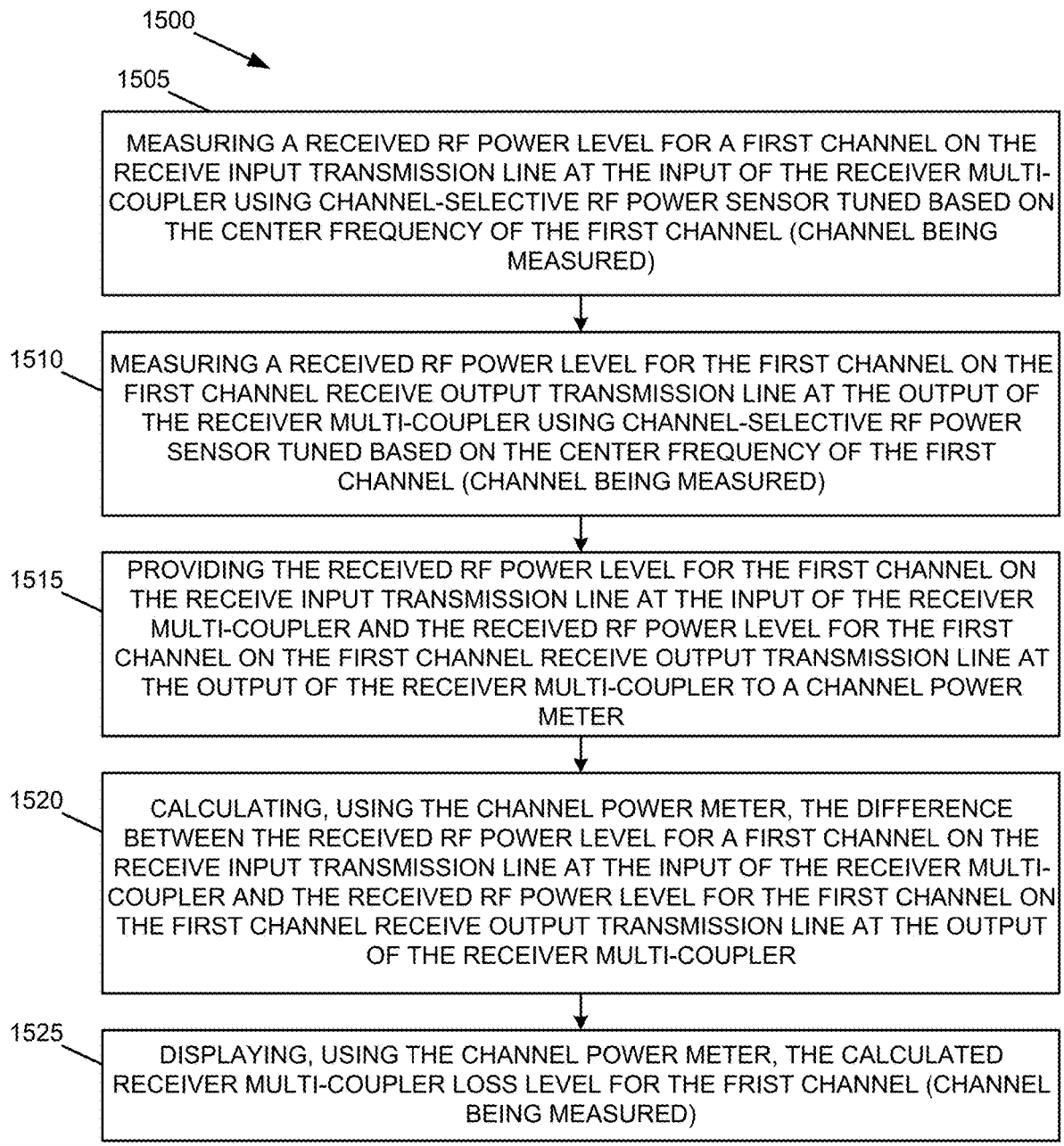
FIG. 19 is a flow chart showing a method for determining receiver multi-coupler loss in the RF receiving system using RF power metering system with channel-selective RF power sensor in accordance with an exemplary embodiment of the invention.

FIG. 19 is a flow chart showing a method 1500 for determining receiver multi-coupler loss in RF receive system 850 using RF power metering system 800 with channel-selective RF power sensor 100.

In block 1505, a received RF power level for a first channel on the receive input transmission line 860 is measured at the input of the receiver multi-coupler 865 using channel-selective RF power sensor 100 tuned based on the center frequency of the first channel (channel being measured). Channel-selective RF power sensor 100 can have a non-directional coupler 302 or a directional coupler 301.

In block 1510, a received RF power level for the first channel on the first channel receive output transmission line 870 is measured at the output of the receiver multi-coupler 865 using channel-selective RF power sensor 100 tuned based on the center frequency of the first channel (channel being measured).

In block 1515, the received RF power level for the first channel on the receive input transmission line 860 at the input of the receiver multi-coupler 865 is provided to a channel power meter 720, and the received RF power level for the first channel on the first channel receive output transmission line 870 at the output of the receiver multi-coupler 865 is provided to the channel power meter 720.

In block 1520, the receiver multi-coupler loss level for the first channel (channel being measured) is calculated using the channel power meter 720. The receiver multi-coupler loss level for the first channel is the difference between the received RF power level for the first channel on the receive input transmission line 860 at the input of the receiver multi-coupler 865 and the received RF power level for the first channel on the first channel receive output transmission line 870 at the output of the receiver multi-coupler 865.

In block 1525, the calculated receiver multi-coupler loss level for the first channel (channel being measured) is displayed using channel power meter 720.

Figure 20:
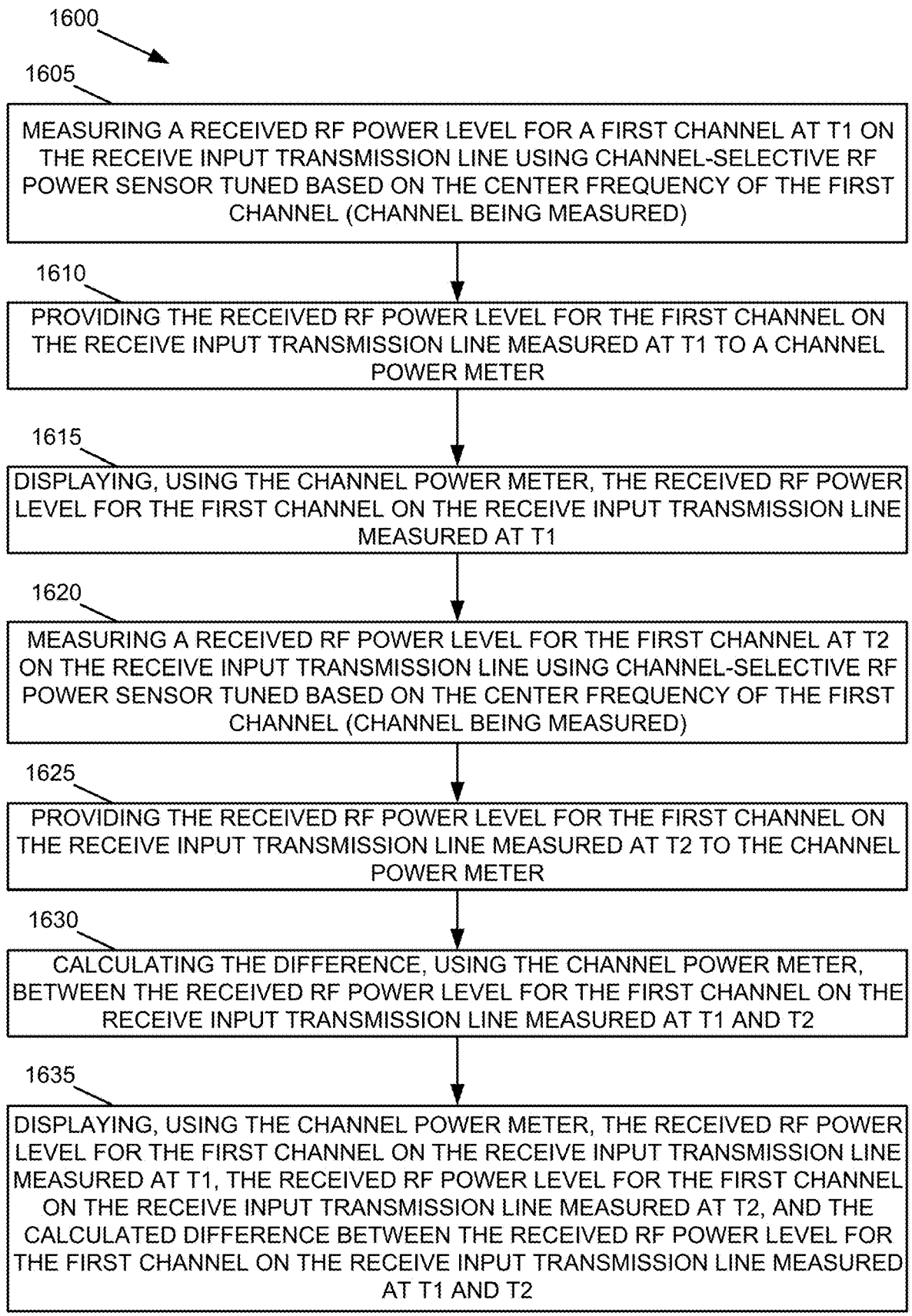
FIG. 20 is a flow chart showing a method for determining antenna loss in the RF receive system using RF power metering system with channel-selective RF power sensor in accordance with an exemplary embodiment of the invention.

FIG. 20 is a flow chart showing a method 1600 for determining antenna loss in the RF receive system 850 using RF power metering system 800 with channel-selective RF power sensor 100.

In block 1605, a received RF power level from a first channel at time T1 on the receive input transmission line 860 is measured using channel-selective RF power sensor 100 tuned based on the center frequency of the first channel (channel being measured).

In block 1610, the received RF power level for the first channel on the receive input transmission line 860 measured at T1 is provided to a channel power meter 720.

In block 1615, the received RF power level for the first channel on the receive input transmission line 860 measured at T1 is displayed using channel power meter 720.

In block 1620, a received RF power level for the first channel is measured at T2 on the receive input transmission line 860 using channel-selective RF power sensor 100 tuned based on the center frequency of the first channel (channel being measured).

In block 1625, the received RF power level for the first channel on the receive input transmission line 860 measured at T2 is provided to the channel power meter 720.

In block 1630, the difference between the received RF power level for the first channel on the receive input transmission line 860 measured at T1 and T2 is calculated by channel power meter 720, where the measurement at T1 occurs prior to the measurement at T2.

In block 1635, the received RF power level for the first channel on the receive input transmission line 860 measured at T1 is displayed by channel power meter 720, the received RF power level for the first channel on the receive input transmission line 860 measured at T2 is displayed by channel power meter 720, and the calculated difference between the received RF power level for the first channel on the receive input transmission line 860 measured at T1 and T2 is displayed by the channel power meter 720.

In an exemplary embodiment, time T1 could be at site commissioning, and time T2 could be a periodic time period when the difference between the received RF power level for the first channel on the receive input transmission line 860 measured at T1 and T2 is calculated to check for degredation of the receive antenna 851, receive input transmission line 860, receive preselection filter 855, or other parts of receive system 850.

Further, in addition to the receive antenna 851, it is contemplated that other areas of receive system 850 can also be periodically monitored, including, but not limited to the first channel receive output transmission line 870, receiver multi-coupler 865, and second channel receive output transmission line 875.

The invention claimed is:

1. A channel-selective RF power sensor comprising:
   an enclosure containing a directional coupler and a channel-selective power measurement circuit;
   said directional coupler is configured to obtain a sample of energy travelling on a main transmission line and provide said sample of energy directly to said channel-selective power measurement circuit, wherein said sample of energy containing a channel of interest; and
   said channel-selective power measurement circuit is configured to measure RF energy information for said channel of interest in said sample of energy,
   said channel-selective power measurement circuit is comprised of an I/Q receiver, a digitizer, and a processor, said digitizer is two-channel synchronous analog to digital converter, and a microprocessor;
   said I/Q receiver is tunable to a frequency of said channel of interest for downconverting said sample of energy into baseband I/Q, thereby providing an in-phase sample of energy and a quadrature sample of energy to said ADC;
   said ADC for sampling and digitizing said in-phase sample of energy and a quadrature sample of energy, thereby providing a digitized in-phase sample of energy and a digitized quadrature sample of energy to said processor;
   said processor for applying a calibration correction factor and performing a combination of image frequency cancellation, channel bandwidth filtering, and calculate RF energy information for said channel of interest of said sample of energy using said digitized in-phase sample of energy and said digitized quadrature sample of energy;
   wherein said directional coupler and said channel-selective power measurement circuit are contained in said carrier body of said channel-selective RF power sensor, thereby permitting said channel selective RF power sensor to be calibrated at the time of manufacture by determining at the factory said calibration correction factor and storing in a memory of said channel-selective RF power sensor.

2. The channel-selective RF power sensor of claim 1, wherein said channel-selective power measurement circuit is further configured to output said RF energy information for said channel of interest of said sample of energy.

3. The channel-selective RF power sensor of claim 1, wherein said receiver of said channel-selective power measurement circuit is configured to select said channel of interest in said sample of energy by rejecting frequencies in said sample of energy that are outside of the bandwidth of said channel of interest, wherein said center frequency and bandwidth of said channel of interest is user selectable.

4. The channel-selective RF power sensor of claim 3, wherein said bandwidth of said channel of interest is one of 6.25 kHz, 12.5 kHz, or 25 kHz.

5. The channel-selective RF power sensor of claim 1, wherein said RF energy information includes RMS power, peak power, duty cycle, crest factor, VSWR, complementary cumulative distribution function, peak, average, peak-to-average ratio, rise time, fall time, and pulse width.

6. The channel-selective RF power sensor of claim 1, wherein said RF power sensor is calibratable across a temperature of said power sensor to compensate for thermally induced drift in said channel-selective RF power sensor, and said channel-selective RF power sensor is calibratable to compensate for a frequency of said channel of interest.

7. The channel-selective RF power sensor of claim 3, wherein said receiver is configured to down-convert said sample of energy to baseband or a low intermediate frequency.

8. The channel-selective RF power sensor of claim 7, wherein said receiver has a local oscillator that is tunable over a wide frequency range, thereby permitting said channel-selective RF power sensor to measure power at frequencies within about the frequency range of said local oscillator.

9. The channel-selective RF power sensor of claim 8, wherein said local oscillator down-converts said sample of energy to baseband of low intermediate frequency using an in-phase signal, a quadrature signal, an in-phase mixer, and a quadrature mixer.

10. The channel-selective RF power sensor of claim 8, wherein said channel-selective power measurement circuit has an in-phase bandpass filter and a quadrature bandpass filter that pass only frequencies of the downconverted sample of energy within the channel of interest;
    wherein said in-phase bandpass filter and quadrature bandpass filter are digital filters or analog filters.

11. The channel-selective RF power sensor of claim 1, wherein said channel-selective power measurement circuit is comprised of integrated devices or discrete devices.

12. The channel-selective RF power sensor of claim 10, wherein said in-phase bandpass filter is an FIR filter and said quadrature bandpass filter is an FIR filter.

13. The channel-selective RF power sensor of claim 1, wherein said directional coupler has an RF switch with a forward position and a reflected position, thereby allowing said forward and reflected power obtained by said directional coupler to be multiplexed for processing by said channel-selective power measurement circuit.

14. The channel-selective RF power sensor of claim 1, wherein said channel-selective power measurement circuit has a variable gain stage that permits the amplification of small signals, thereby increasing the dynamic range of the channel-selective RF power sensor.

15. The channel-selective RF power sensor of claim 1, wherein said RF power sensor is a thru-line sensor or a terminating sensor.

16. A channel-selective RF power sensor comprising:
- an enclosure containing a printed circuit board having a directional coupler and a channel-selective power measurement circuit;
- said enclosure having upper and lower cavities with metallic-coated cavity surfaces that form barriers preventing energy from said directional coupler from interfering with said channel-selective power measurement circuit;
- a via wall between said directional coupler and said channel-selective power measurement circuit on said printed circuit board to provide isolation maintain directivity;
- said directional coupler is configured to obtain a sample of energy travelling on a main transmission line and provide said sample of energy directly to said channel-selective power measurement circuit, wherein said sample of energy containing a channel of interest; and
- said channel-selective power measurement circuit is configured to measure RF energy information for said channel of interest in said sample of energy,
- wherein said channel-selective power measurement circuit implements band-pass filtering I/Q to the channel bandwidth, applies a Hilbert transform to the quadrature channel to impose a 90° phase shift, applies a matched delay to the in-phase channel to match the Hilbert transform's group delay; and sums the quadrature and in-phase channels so desired signals add constructively and the image cancels destructively;
- wherein an in-phase signal and a quadrature signal of a local oscillator of said channel-selective power measurement circuit are offset from a center frequency of said channel of interest to optimize image rejection;
- wherein said channel-selective power measurement circuit implements calibration correction factors determined at the factory and stored in memory; said calibration correction factors comprise path-specific correction factors;
- wherein said RF energy information includes RMS power, peak power, duty cycle, crest factor, VSWR, complementary cumulative distribution function, peak, average, peak-to-average ratio, rise time, fall time, and pulse width;
- a transceiver for making available and transmitting said RF energy information.

17. The channel-selective RF power sensor of claim 16, wherein said path specific correction factors further comprise in phase, quadrature, forward, reflected, and non-directional correction factors.

* * * * *